US012794138B2

(12) United States Patent
Liu et al.

(10) Patent No.: US 12,794,138 B2
(45) Date of Patent: Nov. 10, 2026

(54) ANTENNA SLOT STRUCTURE AND ELECTRONIC DEVICE

(71) Applicant: HONOR DEVICE CO., LTD., Guangdong (CN)

(72) Inventors: Jianfeng Liu, Shenzhen (CN); Hongxing Wang, Shenzhen (CN); Lijun Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 284 days.

(21) Appl. No.: 18/275,723

(22) PCT Filed: Dec. 27, 2022

(86) PCT No.: PCT/CN2022/142499
§ 371 (c)(1),
(2) Date: Aug. 3, 2023

(87) PCT Pub. No.: WO2023/155603
PCT Pub. Date: Aug. 24, 2023

(65) Prior Publication Data

US 2024/0178570 A1 May 30, 2024

(30) Foreign Application Priority Data

Feb. 21, 2022 (CN) ........................ 202210157230.3

(51) Int. Cl.
*H01Q 13/10* (2006.01)
*H01Q 1/24* (2006.01)
(Continued)

(52) U.S. Cl.
CPC ............ *H01Q 13/10* (2013.01); *H01Q 1/243* (2013.01); *H01Q 1/273* (2013.01); *H01Q 1/36* (2013.01)

(58) Field of Classification Search
CPC ........... H01Q 1/24; H01Q 1/243; H01Q 1/27; H01Q 1/273; H01Q 1/36; H01Q 1/42;
(Continued)

(56) References Cited

U.S. PATENT DOCUMENTS

2018/0070465 A1* 3/2018 Cater ................. B29C 37/0082
2018/0233807 A1* 8/2018 Ma .................... H01Q 21/0075
(Continued)

FOREIGN PATENT DOCUMENTS

CN 206272691 U 6/2017
CN 206962019 U 2/2018
(Continued)

*Primary Examiner* — Thai Pham
(74) *Attorney, Agent, or Firm* — WOMBLE BOND DICKINSON (US) LLP

(57) ABSTRACT

An antenna slot structure and an electronic device are provided and relate to the field of terminal technologies. The antenna slot structure includes insulating plastic and a metal frame. The metal frame includes a first part and a second part, and the first part and the second part are separated to form an antenna slot. At least one of the first part and the second part is provided with a first groove at the antenna slot. The first groove starts from the antenna slot and extends toward a direction away from the antenna slot; and the insulating plastic fills the first groove and the antenna slot. The solution improves the bonding strength between the insulating plastic and the metal frame at the antenna slot, enhances the airtightness of the electronic device, and ensures the dustproof and waterproof capabilities of the electronic device.

20 Claims, 16 Drawing Sheets

(51) Int. Cl.

| | |
|---|---|
| ***H01Q 1/27*** | (2006.01) |
| ***H01Q 1/36*** | (2006.01) |
| ***H05K 5/02*** | (2006.01) |

(58) Field of Classification Search
CPC ........ H01Q 1/422; H01Q 1/425; H01Q 13/10; H05K 5/0247; H05K 5/069; H05K 5/04
See application file for complete search history.

(56) References Cited

U.S. PATENT DOCUMENTS

| | | | | |
|---|---|---|---|---|
| 2020/0076058 | A1* | 3/2020 | Zhang | H01Q 9/30 |
| 2021/0328349 | A1* | 10/2021 | Jian | H01Q 13/10 |
| 2022/0006176 | A1* | 1/2022 | Froese | H01Q 1/243 |
| 2024/0006768 | A1* | 1/2024 | Yu | H01Q 5/385 |

FOREIGN PATENT DOCUMENTS

| | | | | | |
|---|---|---|---|---|---|
| CN | 107834206 | A | | 3/2018 | |
| CN | 108174541 | A | | 6/2018 | |
| CN | 108281753 | A | * | 7/2018 | H01Q 1/38 |
| CN | 109586031 | A | | 4/2019 | |
| CN | 110212287 | A | | 9/2019 | |
| CN | 111628283 | A | | 9/2020 | |
| CN | 112532263 | A | | 3/2021 | |
| CN | 214336900 | U | | 10/2021 | |
| CN | 113708061 | A | | 11/2021 | |
| CN | 113764860 | A | | 12/2021 | |
| CN | 113972465 | A | | 1/2022 | |
| JP | 2013042376 | A | | 2/2013 | |

* cited by examiner

ANTENNA SLOT STRUCTURE AND ELECTRONIC DEVICE

CROSS-REFERENCE TO RELATED APPLICATIONS

This application is a national stage of International Application No. PCT/CN2022/142499 filed on Dec. 27, 2022, which claims priority to Chinese Patent Application No. 202210157230.3 filed on Feb. 21, 2022. The disclosures of both of the aforementioned application are hereby incorporated by reference in their entireties.

TECHNICAL FIELD

This application relates to the field of terminal technologies, and in particular, to an antenna slot structure and an electronic device.

BACKGROUND

Currently, electronic devices can support mobile communication functions such as 2G, 3G, 4G, and 5G, and/or support wireless communication functions such as wireless local area networks (Wireless Local Area Networks, WLANs), Bluetooth (Bluetooth, BT), the global navigation satellite system (Global Navigation Satellite System, GNSS), frequency modulation (Frequency Modulation, FM), the near field communication (Near Field Communication, NFC) technology, and the infrared (Infrared, IR) technology. To implement the foregoing communication functions, the electronic devices need to be equipped with corresponding antennas.

An electronic device is generally provided with an antenna slot on a metal frame of a housing. A plurality of antenna slots may be arranged. In addition, an antenna is positioned close to the antenna slot. The antenna slot provides a channel for signals sent or received by the antenna. Moreover, to improve the airtightness of the electronic device and ensure the dustproof and waterproof capabilities of the electronic device, the antenna slot is generally filled with insulating plastic, and the insulating plastic is tightly bonded to the metal frame at the antenna slot.

However, during assembly and factory delivery of an electronic device, the electronic device may be bent or squeezed, or encounter another case, and when a user uses the electronic device, the electronic device may be bent, squeezed, or dropped, or encounter another case. The foregoing cases may cause the insulating plastic filled at the antenna slot to be no longer tightly bonded to the metal frame. As a result, the airtightness of the electronic device is destroyed, and the dustproof and waterproof capabilities of the electronic device are degraded.

SUMMARY

To resolve the foregoing problems, this application provides an antenna slot structure and an electronic device, which improves bonding strength between the insulating plastic and the metal frame at the antenna slot, enhances the airtightness of the electronic device, and further ensures the dustproof and waterproof capabilities of the electronic device.

According to a first aspect, this application provides an antenna slot structure applied to an electronic device with an antenna. The antenna slot structure includes insulating plastic and a metal frame. The metal frame is separated into a first part and a second part by an antenna slot. The first part and/or the second part is provided with a first groove at the antenna slot. The first groove starts from the antenna slot and extends toward a direction away from the antenna slot. The insulating plastic fills the first groove and the antenna slot.

The antenna slot is equivalent to a fracture, and cross sections of the first part and the second part are opposite to each other. When the first part is provided with a first groove, a notch of the first groove starts from the antenna slot and extends toward a direction away from the antenna slot on the first part, and the notch of the first groove is located on a cross section corresponding to the first part: and when the second part is provided with a first groove, a notch of the first groove starts from the antenna slot and extends toward a direction away from the antenna slot on the second part, and the notch of the first groove is located on a cross section corresponding to the second part. After the first groove and the antenna slot are both filled with the insulating plastic, a contact area between the insulating plastic and the metal frame is increased, connection stability and bonding strength between the insulating plastic and the metal frame are further improved, and a thickness of insulating plastic at the first groove is increased, so that when the antenna slot structure is bent, squeezed, or dropped, or encounters another case, possibility of cracking is reduced. Therefore, the airtightness of the electronic device is enhanced, and the dustproof and waterproof capabilities of the electronic device are further ensured.

In a possible implementation, a concave surface of the first groove may include a milled trench and/or a laser carving to further improve the connection stability and bonding strength between the metal frame and the insulating plastic. With the milled trench or the laser carving on the concave surface of the first groove, a contact area between the insulating plastic and the metal frame is increased, the connection stability and bonding strength between the insulating plastic and the metal frame are further improved, so that when the antenna slot structure is bent, squeezed, or dropped, or encounters another case, the insulating plastic at the concave surface of the first groove and the metal frame do not tend to relatively move. Therefore, possibility of cracking of connection between the insulating plastic at the concave surface of the first groove and the metal frame is reduced, the airtightness of the electronic device is enhanced, and the dustproof and waterproof capabilities of the electronic device are further ensured.

In a possible implementation, the metal frame includes a first side and a second side connected in sequence, and the first groove is located on the first side. At least one of the first part and the second part is further provided with one or more second grooves on the second side. The insulating plastic covers the first side and the second side and fills the one or more second grooves.

After the second groove and the antenna slot are both filled with the insulating plastic, a contact area between the insulating plastic and the metal frame is increased, connection stability and bonding strength between the insulating plastic and the metal frame are further improved, the second groove structure can limit the insulating plastic, and a thickness of the insulating plastic is increased, so that when the antenna slot structure is bent, squeezed, or dropped, or encounters another case, the possibility of cracking is reduced. Therefore, the airtightness of the electronic device is enhanced, and the dustproof and waterproof capabilities of the electronic device are further ensured.

In a possible implementation, at least one of the first part and the second part is provided with one second groove on the second side. The second groove extends to the first side; and a notch of the second groove on the first side is entirely located on the concave surface of the first groove, or a notch of the second groove on the first side is partially located on the concave surface of the first groove.

In a possible implementation, at least one of the first part and the second part is provided with one or more second grooves on the second side: the plurality of second grooves extend to the first side: a notch of one of the plurality of second grooves on the first side is partially located on the concave surface of the first groove: and the plurality of second grooves include at least one second groove whose notch on the first side is located outside the first groove.

In a possible implementation, the plurality of second grooves further include at least one second groove whose notch on the first side is entirely located on the concave surface of the first groove.

In a possible implementation, a concave surface of the one or more second grooves includes at least one of the following: a milled trench or a laser carving. With the milled trench or the laser carving on the concave surface of the second groove, a contact area between the insulating plastic and the metal frame is further increased, connection stability and bonding strength between the insulating plastic and the metal frame are improved, so that when the antenna slot structure is bent, squeezed, or dropped, or encounters another case, the insulating plastic at the concave surface of the second groove and the metal frame do not tend to relatively move. Therefore, possibility of cracking of the insulating plastic at the concave surface of the second groove is reduced, the airtightness of the electronic device is enhanced, and the dustproof and waterproof capabilities of the electronic device are further ensured.

In a possible implementation, the one or more second grooves include at least one of the following: a through groove or a blind groove.

In a possible implementation, the first part and the second part both include the second groove, and a quantity of second grooves included in the first part is equal to a quantity of second grooves included in the second part.

In a possible implementation, the first part and the second part both include the first groove, and a quantity of first grooves included in the first part is equal to a quantity of first grooves included in the second part.

According to a second aspect, this application further provides an antenna slot structure. The antenna slot structure includes insulating plastic and a metal frame. The metal frame includes a first part and a second part, and the first part and the second part are separated to form an antenna slot. The metal frame includes a first side and a second side connected in sequence. At least one of the first part and the second part is provided with one or more second grooves on the second side. The insulating plastic covers the first side and the second side and fills the antenna slot and the one or more second grooves.

In the solution, after the second groove and the antenna slot are both filled with the insulating plastic, a contact area between the insulating plastic and the metal frame is increased, connection stability and bonding strength between the insulating plastic and the metal frame are further improved, the second groove structure can limit the insulating plastic, and a thickness of the insulating plastic is increased, so that when the antenna slot structure is bent squeezed, or dropped, or encounters another case, possibility of cracking is reduced. Therefore, the airtightness of the electronic device is enhanced, and the dustproof and waterproof capabilities of the electronic device are further ensured.

In a possible implementation, at least one of the first part and the second part is provided with a first groove at the antenna slot: the first groove is located on the first side: the first groove starts from the antenna slot and extends toward a direction away from the antenna slot: and the insulating plastic fills the first groove.

In a possible implementation, a concave surface of the first groove includes at least one of the following: a milled trench or a laser carving.

In a possible implementation, at least one of the first part and the second part is provided with one second groove on the second side: the second groove extends to the first side; and a notch of the second groove on the first side is entirely located on the concave surface of the first groove, or a notch of the second groove on the first side is partially located on the concave surface of the first groove.

In a possible implementation, at least one of the first part and the second part is provided with one or more second grooves on the second side: the plurality of second grooves extend to the first side: a notch of one of the plurality of second grooves on the first side is partially located on the concave surface of the first groove: and the plurality of second grooves include at least one second groove whose notch on the first side is located outside the first groove.

In a possible implementation, the plurality of second grooves further include at least one second groove whose notch on the first side is entirely located on the concave surface of the first groove.

In a possible implementation, a concave surface of the one or more second grooves includes at least one of the following: a milled trench or a laser carving.

In a possible implementation, the one or more second grooves include at least one of the following: a through groove or a blind groove.

According to a third aspect, this application further provides an electronic device. The electronic device may be a mobile phone, a notebook computer, a wearable electronic device (such as a smart watch), a tablet computer, or other electronic devices with an antenna. The electronic device includes one or more antenna slot structures provided in the foregoing implementations.

As the antenna slot structure of the electronic device is provided with the first groove and/or the second groove, after the groove and the antenna slot are both filled with the insulating plastic, a contact area between the insulating plastic and the metal frame is increased, and the connection stability and the bonding strength between the insulating plastic and the metal frame are further improved. Specifically, after the first groove is filled with the insulating plastic, a thickness of insulating plastic near the antenna slot is improved, and possibility of cracking of the insulating plastic near the antenna slot is reduced. The second groove can limit and clamp the insulating plastic, so that when the antenna slot structure is bent, squeezed, or dropped, or encounters another case, possibility of cracking is reduced. Therefore, the airtightness of the electronic device is enhanced, and the dustproof and waterproof capabilities of the electronic device are further ensured.

In a possible implementation, the electronic device includes a plurality of antenna slot structures, and further includes a first short edge, a first long edge, a second short edge, and a second long edge connected in sequence. The plurality of antenna slot structures include a first group of antenna slot structures and a second group of antenna slot structures. The first group of antenna slot structures is located on the first long edge: and the second group of antenna slot structures is located on the second long edge.

In a possible implementation, the plurality of antenna slot structures further includes a third group of antenna slot structures and a fourth group of antenna slot structures. The third group of antenna slot structures is located on the first short edge: and the fourth group of antenna slot structures is located on the second short edge.

DESCRIPTION OF EMBODIMENTS

Figure 1:
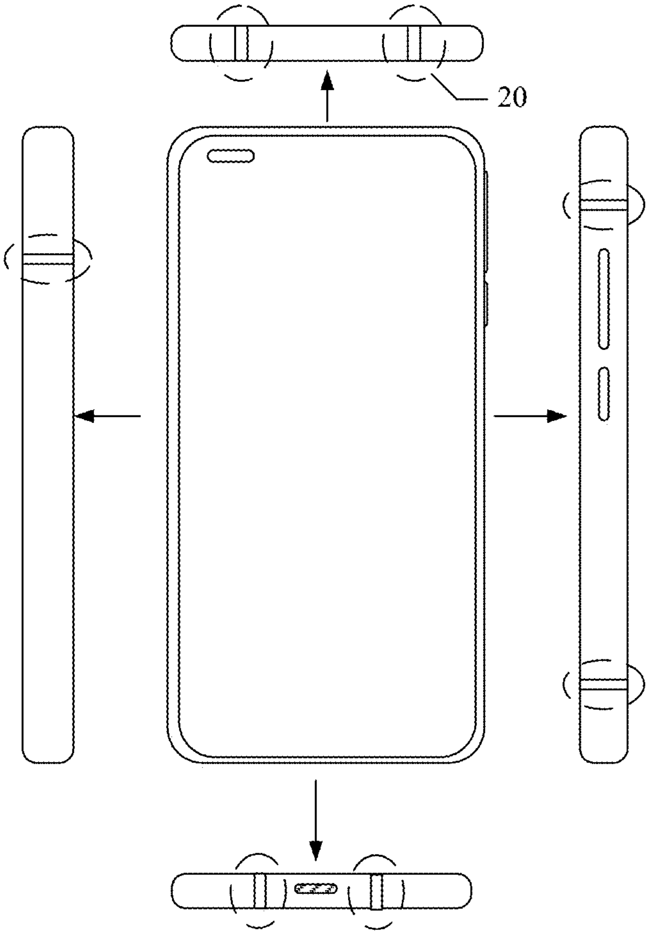
FIG. 1 is a schematic diagram of a mobile phone.

To enable those skilled in the art to understand the solutions of this application more clearly, application scenarios of the technical solutions of this application are first described below:

The solution provided in this application is applied to an electronic device with an antenna. This application does not specifically limit a type of the electronic device, and the electronic device may be a mobile phone, a notebook computer, a wearable electronic device (such as a smart watch), a tablet computer, an augmented reality (augmented reality. AR) device, a virtual reality (virtual reality. VR) device, an in-vehicle device, or the like. A structure of the electronic device is described below with examples.

A communication function of the electronic device is implemented by an antenna group, a mobile communication module, a wireless communication module, a modem processor, a baseband processor, and the like.

An antenna group generally includes a plurality of antennas configured to implement a mobile communication function and a wireless communication function. Specifically, an antenna group is configured to transmit and receive electromagnetic wave signals. Each antenna in the electronic device may be configured to cover one or more communication frequency bands. Different antennas may further be multiplexed to increase antenna utilization. For example, an antenna in an antenna group may be multiplexed as a diversity antenna of a wireless local area network. In some other embodiments, an antenna may be used in combination with a tuning switch.

The mobile communication module may provide a solution to wireless communication such as 2G. 3G, 4G. 5G, or the like applied to the electronic device. The mobile communication module may include at least one filter, a switch, a power amplifier, a low noise amplifier (low noise amplifier. LNA), and the like. The mobile communication module may receive an electromagnetic wave through an antenna in the antenna group, perform processing such as filtering and amplification on the received electromagnetic wave, and send a processed electromagnetic wave to the modem processor for demodulation. The mobile communication module may further amplify a signal modulated by the modem processor, and convert the signal into an electromagnetic wave for radiation through an antenna in the antenna group. In some embodiments, at least some function modules of the mobile communication module may be arranged in a processor. In some embodiments, at least some function modules of the mobile communication module may be arranged in a same device as at least some modules of the processor.

The modem processor may include a modulator and a demodulator. The modulator is configured to modulate a low frequency baseband signal that is to be sent into a medium or high frequency signal. The demodulator is configured to demodulate the received electromagnetic wave signal into a low frequency baseband signal. Then, the demodulator sends the low frequency baseband signal obtained through demodulation to the baseband processor for processing. The low frequency baseband signal is transmitted to an application processor after being processed by the baseband processor. The application processor outputs a sound signal through an audio device (which is not limited to a speaker, a telephone receiver, and the like), or displays an image or a video through a display screen. In some embodiments, the modem processor may be an independent device. In some other embodiments, the modem processor may be independent of the processor and arranged in a same device as the mobile communication module or other function modules.

The wireless communication module may provide wireless communication solutions applied to the electronic device, including wireless local area networks (Wireless Local Area Networks. WLANs) (for example, a Wi-Fi network). Bluetooth (Bluetooth. BT), the global navigation satellite system (Global Navigation Satellite System. GNSS), frequency modulation (Frequency Modulation. FM), the near field communication (Near Field Communication, NFC) technology, the infrared (Infrared. IR) technology, and the like. The wireless communication module may be one or more devices integrating at least one communication processing module. The wireless communication module receives an electromagnetic wave through an antenna in the antenna group, performs frequency modulation and filtering on an electromagnetic wave signal, and sends a processed signal to the processor. The wireless communication module may further receive a to-be-sent signal from the processor, perform frequency modulation and amplification on the to-be-sent signal, and convert the to-be-sent signal into an electromagnetic wave for radiation through the antenna in the antenna group.

In some embodiments, the wireless communication technology may include a global system for mobile communications (global system for mobile communications, GSM), a general packet radio service (general packet radio service. GPRS), code division multiple access (code division multiple access. CDMA), wideband code division multiple access (wideband code division multiple access. WCDMA), time-division code division multiple access (time-division code division multiple access. TD-SCDMA), long term evolution (long term evolution. LTE), BT, the GNSS. WLAN, the NFC. FM, the IR technology, and/or the like. The GNSS may include a global positioning system (global positioning system. GPS), a global navigation satellite system (global navigation satellite system, GLONASS), and a beidou navigation satellite system (beidou navigation satellite system. BDS), a quasi-zenith satellite system (quasi-zenith satellite system. QZSS), and/or a satellite based augmentation system (satellite based augmentation system. SBAS).

To strengthen a body of an electronic device and improve look and feel of the electronic device, the electronic device generally adopts a metal frame, and an antenna slot is provided at the metal frame. A plurality of antenna slots may be arranged. In addition, an antenna is positioned close to the antenna slot. The antenna slot provides a channel for signals sent or received by the antenna.

In addition, an International Protection Marking (International Protection Marking. IEC 60529) is also referred to as an Ingress Protection Rating (Ingress Protection Rating) or an IP Code (IP Code), and is also referred to as a "waterproof rating". "dustproof rating", and the like sometimes, which defines a degree of protection capability that mechanical equipment and an electronic device can provide against ingress of solid foreign objects (including body parts such as fingers, dust, grit, and the like), ingress of liquids, and accidental contact. To improve the airtightness of the electronic device and ensure the dustproof and waterproof capabilities of the electronic device, insulating plastic is generally filled at the antenna slot, and the insulating plastic and a frame at the antenna slot are tightly bonded.

Implementations of an antenna slot structure are below using an example in which the electronic device is a mobile phone. Cases of electronic devices of other types are similar. Details are not described herein again.

FIG. 1 is a schematic diagram of a mobile phone.

FIG. 1 shows the mobile phone and a left side view: a right side view: a top view: and a bottom view of the mobile phone. A layout and a quantity of antenna slot structures 20 arranged on a surrounding frame in FIG. 1 are only a possible implementation.

Figure 2:
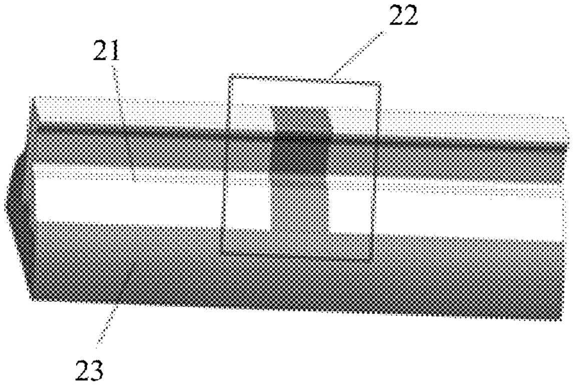
FIG. 2 is a schematic diagram of an antenna slot structure.

FIG. 2 is a schematic diagram of an antenna slot structure.

The antenna slot structure shown in the figure includes a metal frame 21 and insulating plastic 23. The metal frame 21 includes an antenna slot 22, and the insulating plastic 23 is filled on an inner side of the metal frame and is filled in the antenna slot 22.

During assembly and factory delivery of a mobile phone, the mobile phone may be bent or squeezed or encounter another case, and when a user uses the mobile phone, the mobile phone may be bent, squeezed, or dropped, or encounter another case. The foregoing case may cause the insulating plastic 23 filled at the antenna slot 20 to be no longer tightly bonded to the metal frame 21. As a result, the airtightness of the mobile phone is destroyed, and the actual dustproof and waterproof capabilities of the mobile phone are degraded. In this case, if the user still uses the mobile phone according to a theoretically corresponding international protection marking, the mobile phone may be damaged, and safety hazards may even exist.

To resolve the foregoing problems, this application provides an antenna slot structure and an electronic device, to improve the connection stability and bonding strength between the insulating plastic and the metal frame, so that when the antenna slot structure is bent, squeezed, or dropped, or encounters another case, the possibility of cracking is reduced. Therefore, the airtightness of the electronic device is enhanced, and the dustproof and waterproof capabilities of the electronic device are further ensured.

To make a person skilled in the art understand the technical solutions in this application more clearly, the following describes the technical solutions in the embodiments of this application with reference to the accompanying drawings in the embodiments of this application.

In the specification of this application, terms such as "first" and "second" are used merely for the purpose of description, and shall not be construed as indicating or implying relative importance or implying a quantity of indicated technical features.

It may be understood that orientation terms such as "upper". "lower". "left", and "right" in the following embodiments of this application are merely for ease of description. It is necessary to refer to directions in the accompanying drawings. The orientation terms do not constitute a limitation to the technical solutions in this application.

Figure 3A:
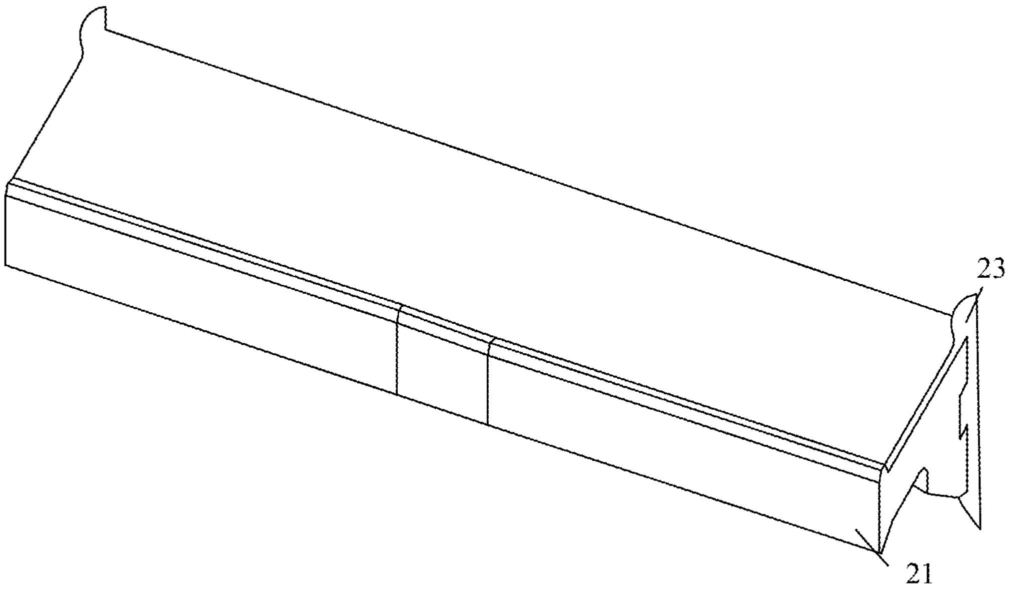
FIG. 3A is a schematic diagram of an antenna slot structure according to an embodiment of this application.
Figure 3B:
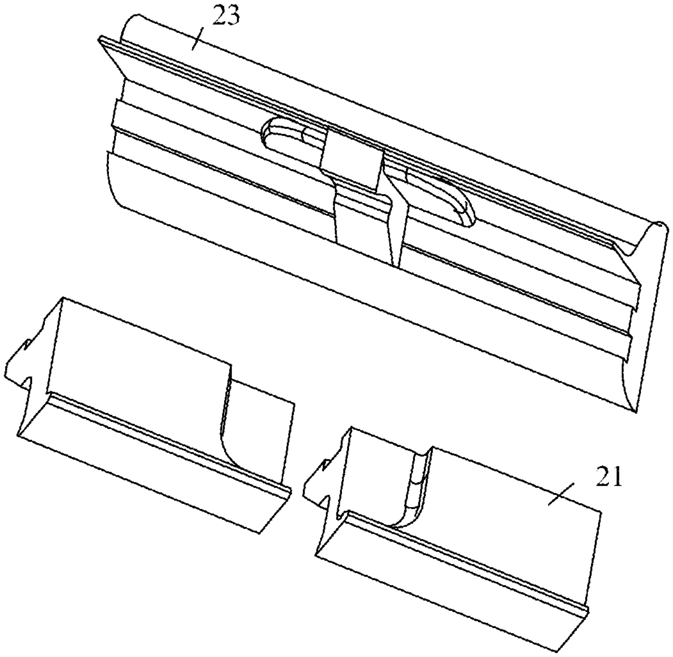
FIG. 3B is an exploded view corresponding to FIG. 3A according to an embodiment of this application.
Figure 4A:
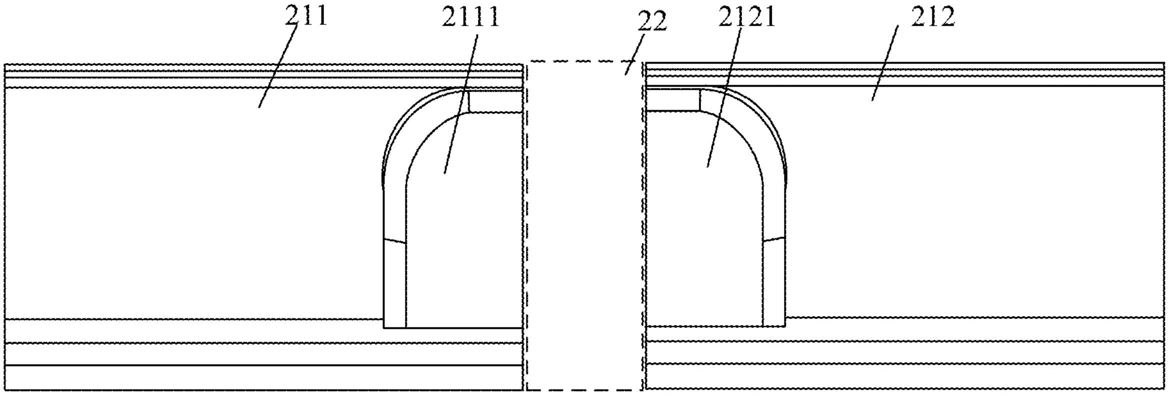
FIG. 4A is a schematic diagram of a metal frame of an antenna slot structure according to an embodiment of this application.
Figure 4B:
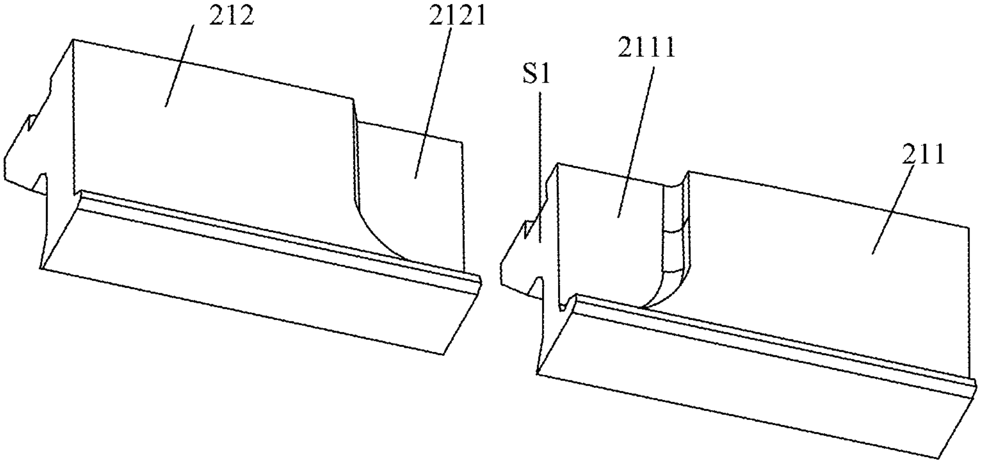
FIG. 4B is a schematic diagram 1 of a metal frame corresponding to FIG. 3A from a different perspective according to an embodiment of this application.
Figure 4C:
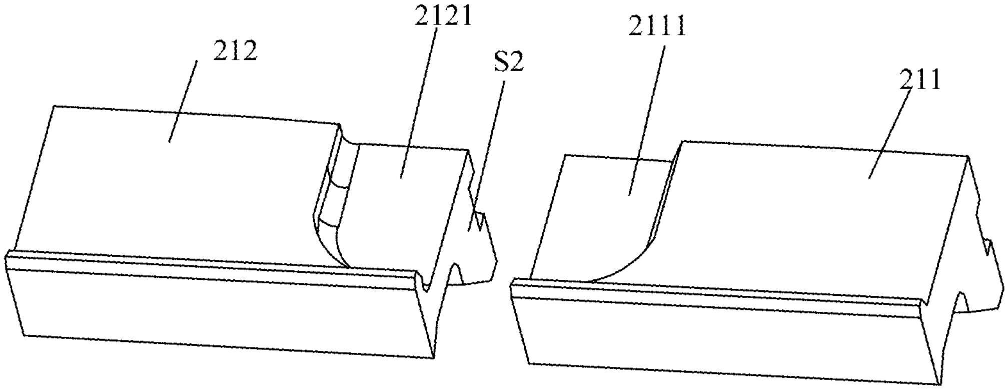
FIG. 4C is a schematic diagram 2 of a metal frame corresponding to FIG. 3A from a different perspective according to an embodiment of this application.
Figure 5:
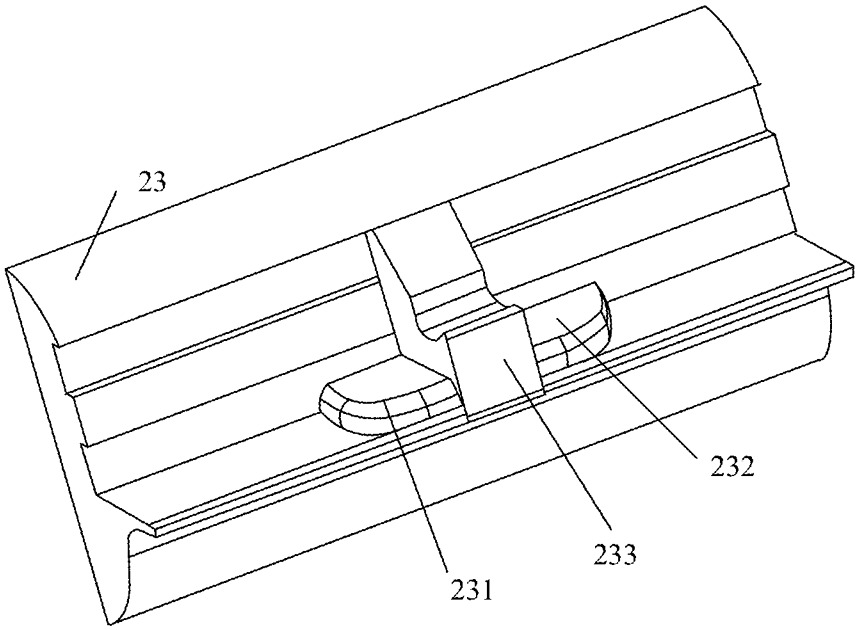
FIG. 5 is a schematic diagram of insulating plastic of an antenna slot structure according to an embodiment of this application.

Refer to FIG. 3A. FIG. 3B. FIG. 4A. FIG. 4B. FIG. c, and FIG. 5 together. FIG. 3A is a schematic diagram of an antenna slot structure according to an embodiment of this application. FIG. 3B is an exploded view corresponding to FIG. 3A according to an embodiment of this application. FIG. 4A is a schematic diagram of a metal frame of an antenna slot structure according to an embodiment of this application. FIG. 4B is a schematic diagram 1 of a metal frame corresponding to FIG. 3A from a different perspective according to an embodiment of this application. FIG. 4C is a schematic diagram 2 of a metal frame corresponding to FIG. 3A from a different perspective according to an embodiment of this application. FIG. 5 is a schematic diagram of insulating plastic of an antenna slot structure according to an embodiment of this application.

The antenna slot structure includes a metal frame 21 and insulating plastic 23.

FIG. 4 is a top view of the metal frame 21 in FIG. 3A after a perspective is adjusted.

The metal frame includes a first part 211 and a second part 212, and the first part 211 and the second part 212 are separated from each other to form an antenna slot 22. That is, the antenna slot 22 is equivalent to a fracture on the metal frame and divides the metal frame into the first part 211 and the second part 212.

Referring to FIG. 4B, the first part 211 forms a first cross section S1 at the antenna slot 22, and the first cross section S1 is a surface of the first part 211 adjacent to the antenna slot. Referring to FIG. 4C, the second part 212 forms a second cross section S2 at the antenna slot 22, and the second cross section S2 is a surface of the second part 212 adjacent to the antenna slot. The first cross section S1 and the second cross section S2 are opposite to each other.

At least one of the first part 211 and the second part 212 is provided with a first groove. An example in which the first part 211 and the second part 212 are both provided with a first groove is used for descriptions in this embodiment of this application. When only one of the first part 211 and the second part 212 is provided with a first groove, a principle of implementation is similar, and details are not described herein again.

The first part 211 is provided with a first groove 2111, a notch of the first groove 2111 starts from the antenna slot 22 and extends on the first part 211 in a direction away from the antenna slot 22, that is, starts from the antenna slot 22 and extends toward the left in FIG. 4. A width, a length, and a depth of the first groove 2111 are not specifically limited in this embodiment of this application.

The second part 212 is provided with a first groove 2121, a notch of the first groove 2121 starts from the antenna slot 22 and extends on the second part 212 in a direction away from the antenna slot 22, that is, starts from the antenna slot 22 and extends toward the right in FIG. 4. A width, a length, and a depth of the first groove 2121 are not specifically limited in this embodiment of this application.

In an actual application, when the first part 211 and the second part 212 are both provided with a first groove, the first grooves on the first part 211 and the second part 212 are generally distributed symmetrically, and have same parameters such as same widths, same lengths, and same depths.

FIG. 5 shows a form of the insulating plastic after curing. FIG. 5 and FIG. 3B are at different perspectives. When the insulating plastic 23 fills the first groove and the antenna slot, part of insulating plastic numbered 233 is filled in the antenna slot 22, part of insulating plastic numbered 231 is filled in the first groove 2111, and part of insulating plastic numbered 232 is filled in the first groove 2111.

A shape of the first groove shown in FIG. 4A to FIG. 4C is only a possible implementation. In an actual application, the first groove may be in another shape, for example, a shape such as a rectangle, a semi-circle, or a triangle.

In the solution provided in this embodiment of this application, after the first groove and the antenna slot are both filled with the insulating plastic, a contact area between the insulating plastic and the metal frame is increased, so that the connection stability and bonding strength between the insulating plastic and the metal frame are further improved. After the insulating plastic fills the first groove, a thickness of the insulating plastic is also increased, so that when the antenna slot structure is bent, squeezed, or dropped, or encounters another case, possibility of cracking is reduced. Therefore, the airtightness of the electronic device is enhanced, and the dustproof and waterproof capabilities of the electronic device are further ensured.

In addition, a milled trench or a laser carving may be further provided in the first groove, to further increase the contact area between the insulating plastic and the metal frame, thereby further improving the connection stability and bonding strength between the insulating plastic and the metal frame, which is described below in detail with the accompanying drawings.

Figure 6:
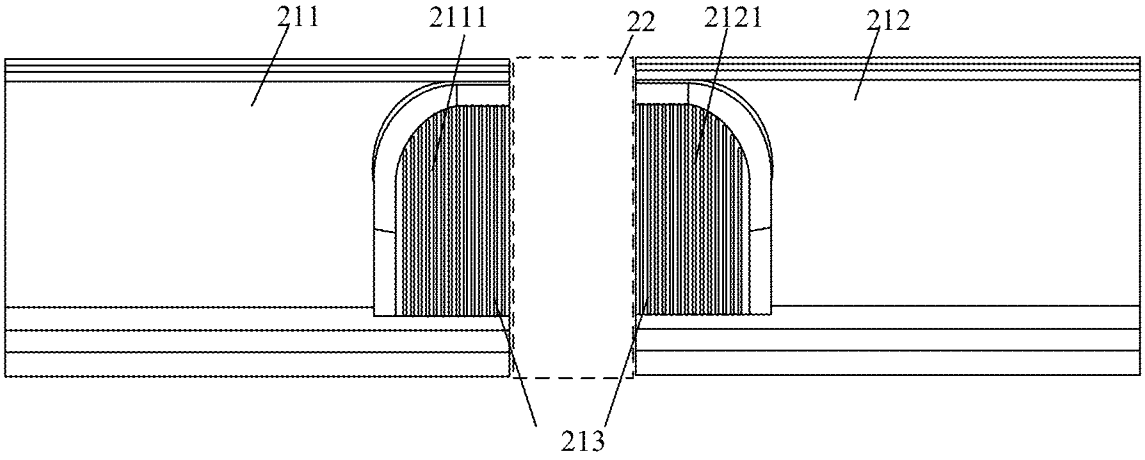
FIG. 6 is a schematic diagram of a metal frame of another antenna slot structure according to an embodiment of this application.

FIG. 6 is a schematic diagram of a metal frame of another antenna slot structure according to an embodiment of this application.

A difference between FIG. 6 and FIG. 4A is that, for a first groove on the first part 211 and the second part 212, a milled trench or a laser carving on a concave surface of the first groove is marked with 213.

The milled trench is a trench processed on a surface of metal using a milling cutter. When the concave surface of the first groove is provided with a milled trench, a quantity, a width, and a depth of the milled trench is not specifically limited in this embodiment of this application.

A laser carving is a permanent marking carved on a surface of metal using a laser (laser) beam. When the concave surface of the first groove is provided with a laser carving, a quantity, a width, a depth, and the like of the laser carving are not specifically limited in this embodiment of this application.

With the milled trench or the laser carving on the concave surface of the first groove, a contact area between the insulating plastic and the metal frame is increased, the connection stability and the bonding strength between the insulating plastic and the metal frame are further improved, so that when the antenna slot structure is bent, squeezed, or dropped, or encounters another case, the insulating plastic at the concave surface of the first groove and the metal frame do not tend to relatively move. Therefore, possibility of cracking of connection between the insulating plastic at the concave surface of the first groove and the metal frame is reduced, the airtightness of the electronic device is enhanced, and the dustproof and waterproof capabilities of the electronic device are further ensured.

Figure 7A:
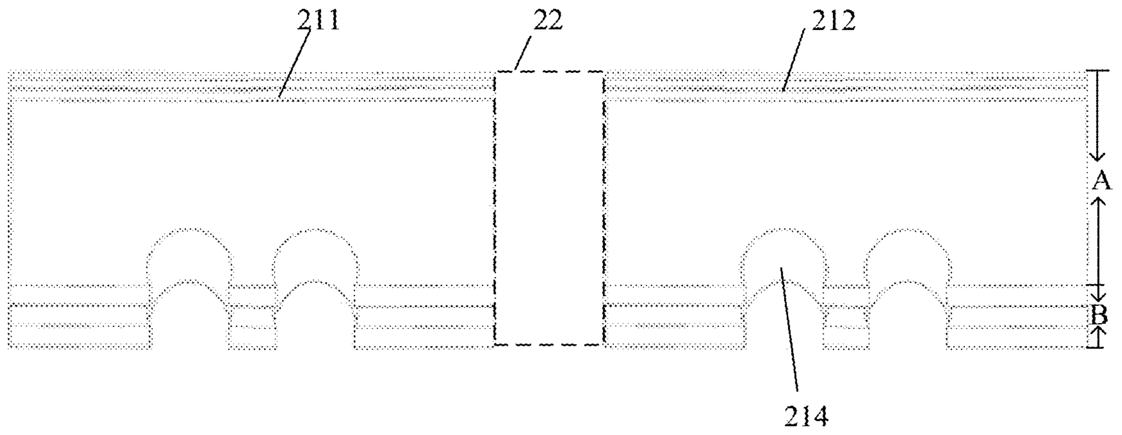
FIG. 7A is a schematic diagram of a metal frame of still another antenna slot structure according to an embodiment of this application.
Figure 7B:
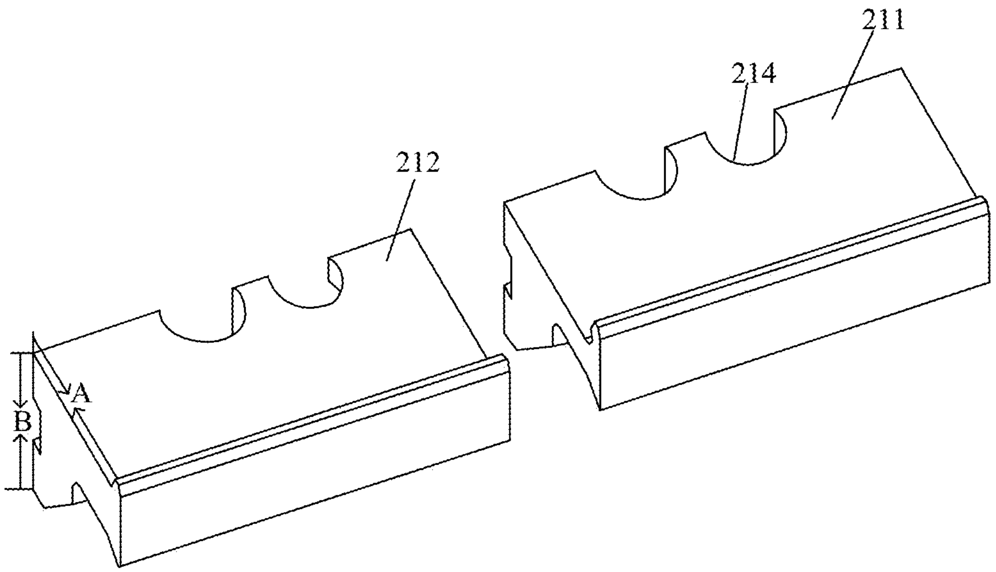
FIG. 7B is a schematic diagram of a metal frame corresponding to FIG. 7A from another perspective according to an embodiment of this application.
Figure 8:
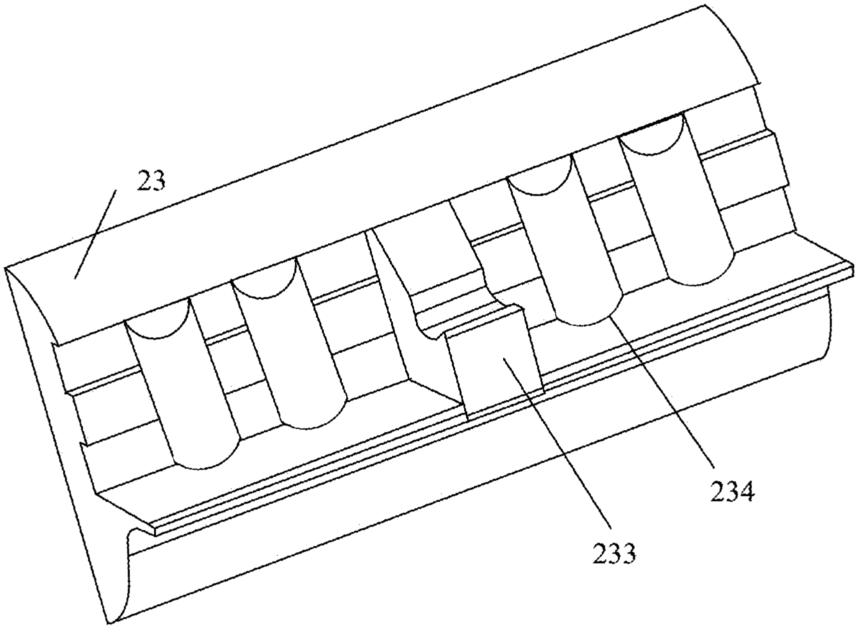
FIG. 8 is a schematic diagram of insulating plastic of another antenna slot structure according to an embodiment of this application.

Another implementation of the antenna slot structure is described below:

Refer to FIG. 7A. FIG. 7B, and FIG. 8 together. FIG. 7A is a schematic diagram of a metal frame of still another antenna slot structure according to an embodiment of this application. FIG. 7B is a schematic diagram of a metal frame corresponding to FIG. 7A from another perspective according to an embodiment of this application. FIG. 8 is a schematic diagram of insulating plastic of another antenna slot structure according to an embodiment of this application.

The antenna slot structure includes a metal frame and insulating plastic 23.

The metal frame includes a first part 211 and a second part 212, and the first part 211 and the second part 212 are separated from each other to form an antenna slot 22. That is, the antenna slot 22 is equivalent to a fracture on the metal frame and divides the metal frame into the first part 211 and the second part 212.

The first part 211 forms a first cross section at the antenna slot 22, and the second part 212 forms a second cross section at the antenna slot 22. The first cross section and the second cross section are opposite to each other.

The metal frame includes a first side and a second side connected in sequence. In FIG. 7A and FIG. 7B, the first side is an A side, and the second side is a B side.

At least one of the first part 211 and the second part 212 is provided with one or more second grooves on the second side 214. An example in which the first part 211 and the second part 212 are both provided with two second grooves 214 is used for descriptions in this embodiment of this application, and when only one of the first part 211 and the second part 212 is provided with a second groove 214, or another quantity of the second grooves 214 are provided, a principle of implementation is similar. Details are not described herein again.

The second groove 214 shown in FIG. 7A and FIG. 7B is a through groove, that is, the second groove 214 penetrates the second side. The second groove 214 shown in FIG. 7A and FIG. 7B is a semi-circular groove. The second groove 214 may be a groove of another shape, such as a rectangular groove, a triangular groove, or a T-shaped groove. In addition, a parameter of the second groove 214, such as a width and a depth, is not specifically limited in this embodiment of this application.

In addition, in some other embodiments, the second groove 214 may be a blind groove, that is, the second groove 214 may not penetrate the second side.

In an actual application, when the first part 211 and the second part 212 are both provided with a second groove, the first grooves on the first part 211 and the second part 212 are generally provided in pairs and have same parameters such as same widths, same lengths, and same depths, which makes the first part 211 and the second part 212 symmetrical relative to the antenna slot to facilitate processing and molding.

FIG. 8 shows a form of insulating plastic 23 after curing. The insulating plastic 23 covers the first side and the second side and fills the antenna slot 22 and the second groove 214.

When the insulating plastic 23 fills the second groove and the antenna slot, part of insulating plastic numbered 233 is filled in the antenna slot 22, and part of insulating plastic numbered 234 is filled in the second groove 214.

In the solution provided in this embodiment of this application, after the second groove and the antenna slot are both filled with the insulating plastic, a contact area between the insulating plastic and the metal frame is increased, connection stability and bonding strength between the insulating plastic and the metal frame are further improved, the second groove structure can limit the insulating plastic, and a thickness of the insulating plastic is increased, so that when the antenna slot structure is bent squeezed, or dropped, or encounters another case, possibility of cracking is reduced. Therefore, the airtightness of the electronic device is enhanced, and the dustproof and waterproof capabilities of the electronic device are ensured.

In addition, a milled trench or a laser carving may be provided in the second groove, which further improve the connection stability and bonding strength between the insulating plastic and the metal frame, and is described below in detail with the accompanying drawings.

Figure 9:
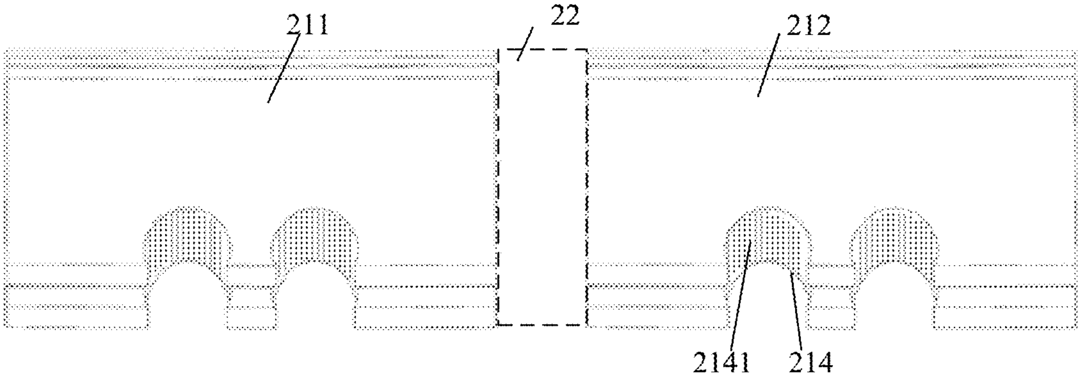
FIG. 9 is a schematic diagram of a metal frame of yet another antenna slot structure according to an embodiment of this application.

FIG. 9 is a schematic diagram of a metal frame of yet another antenna slot structure according to an embodiment of this application.

For a second groove 214 on the first part 211 and the second part 212, a milled trench or a laser carving on a concave surface of the second groove is marked with 2141.

The milled trench is a trench processed on a surface of metal using a milling cutter. When the concave surface of the second groove is provided with a milled trench, a quantity, a width, a depth, and the like of the milled trench are not specifically limited in this embodiment of this application.

A laser carving is a permanent marking carved on a surface of metal using a laser (laser) beam. When the concave surface of the second groove is provided with a laser carving, a quantity, a width, a depth, and the like of the laser carving are not specifically limited in this embodiment of this application.

With the milled trench or the laser carving on the concave surface of the second groove, a contact area between the insulating plastic and the metal frame is further increased, connection stability and bonding strength between the insulating plastic and the metal frame are improved, so that when the antenna slot structure is bent, squeezed, or dropped, or encounters another case, the insulating plastic at the concave surface of the second groove and the metal frame do not tend to relatively move. Therefore, possibility of cracking of the insulating plastic at the concave surface of the second groove is reduced, the airtightness of the electronic device is enhanced, and the dustproof and waterproof capabilities of the electronic device are further ensured.

The antenna slot structure provided in the foregoing embodiments of this application includes the first groove or the second groove, and an implementation that an antenna slot structure includes both a first groove and a second groove is described below.

Figure 10A:
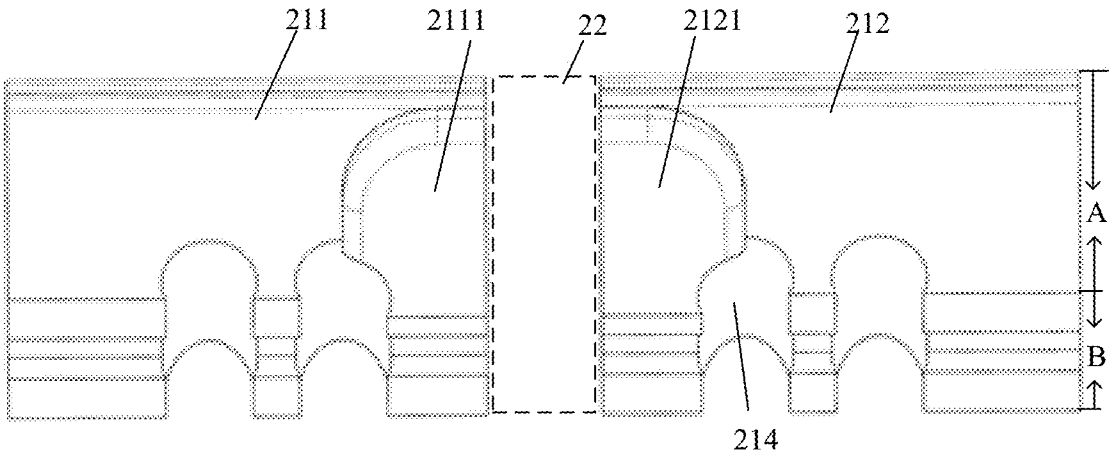
FIG. 10A is a schematic diagram of a metal frame of another antenna slot structure according to an embodiment of this application.
Figure 10B:
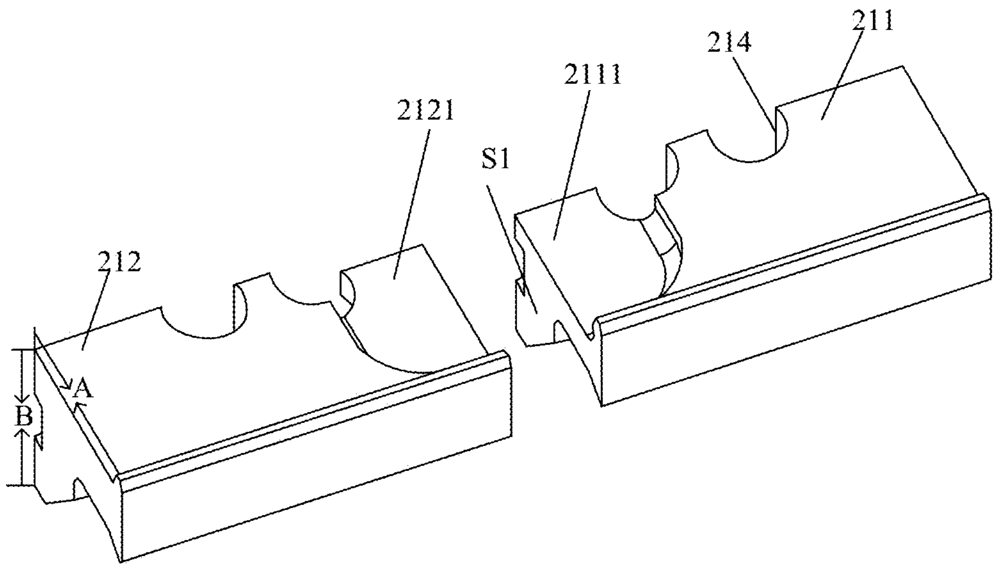
FIG. 10B is a schematic diagram 1 of a metal frame corresponding to FIG. 10A from a different perspective according to an embodiment of this application.
Figure 10C:
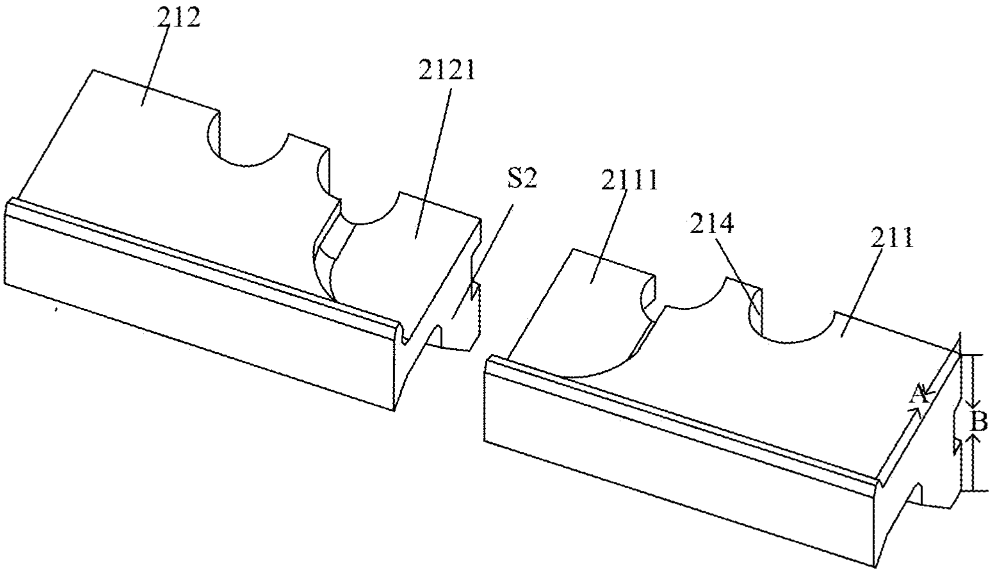
FIG. 10C is a schematic diagram 2 of a metal frame corresponding to FIG. 10A from a different perspective according to an embodiment of this application.

Refer to FIG. 10A. FIG. 10B, and FIG. 10C together. FIG. 10A is a schematic diagram of a metal frame of another antenna slot structure according to an embodiment of this application. FIG. 10B is a schematic diagram 1 of a metal frame corresponding to FIG. 10A from a different perspective according to an embodiment of this application. FIG. 10C is a schematic diagram 2 of a metal frame corresponding to FIG. 10A from a different perspective according to an embodiment of this application.

The antenna slot structure includes a metal frame and insulating plastic.

The metal frame includes a first part 211 and a second part 212, and the first part 211 and the second part 212 are separated from each other to form an antenna slot 22. That is, the antenna slot 22 is equivalent to a fracture on the metal frame and divides the metal frame into the first part 211 and the second part 212.

Referring to FIG. 10B, the first part 211 forms a first cross section S1 at the antenna slot 22. Referring to FIG. 10C, the second part 212 forms a second cross section S2 at the antenna slot 22. The first cross section S1 and the second cross section S2 are opposite to each other.

The metal frame includes a first side and a second side connected in sequence. In FIG. 10A to FIG. 10C, the first side is an A side, and the second side is a B side.

At least one of the first part 211 and the second part 212 is provided with a first groove on the first side. An example in which the first part 211 and the second part 212 are both provided with a first groove is used for descriptions in this embodiment of this application. When only one of the first part 211 and the second part 212 is provided with a first groove, a principle of implementation is similar, and details are not described herein again.

The first part 211 is provided with a first groove 2111, a notch of the first groove 2111 starts from the antenna slot 22 and extends on the first part 211 in a direction away from the antenna slot 22, that is, starts from the antenna slot 22 and extends toward the left in FIG. 10A.

The second part 212 is provided with a first groove 2121, a notch of the first groove 2121 starts from the antenna slot 22 and extends on the second part 212 in a direction away from the antenna slot 22, that is, starts from the antenna slot 22 and extends toward the right in FIG. 10A.

At least one of the first part 211 and the second part 212 is provided with one or more second grooves on the second side 214. An example in which the first part 211 and the second part 212 are both provided with two second grooves 214 is used for descriptions in this embodiment of this application, and when only one of the first part 211 and the second part 212 is provided with a second groove 214, or another quantity of the second grooves 214 are provided, a principle of implementation is similar. Details are not described herein again.

The second groove 214 shown in FIG. 10 is a through groove, that is, the second groove 214 penetrates the second side. In addition, in another possible implementation, the second groove may be a blind groove, that is, the second groove 214 may not penetrate the second side.

A width, a length, a depth, and the like of each first groove and each second groove are not specifically limited in this embodiment of this application. The first groove may be another shape, for example, a shape such as a rectangle, a semi-circle, or a triangle. The second groove 214 may be a groove of another shape, such as a rectangular groove, a triangular groove, or a T-shaped groove.

Figure 11:
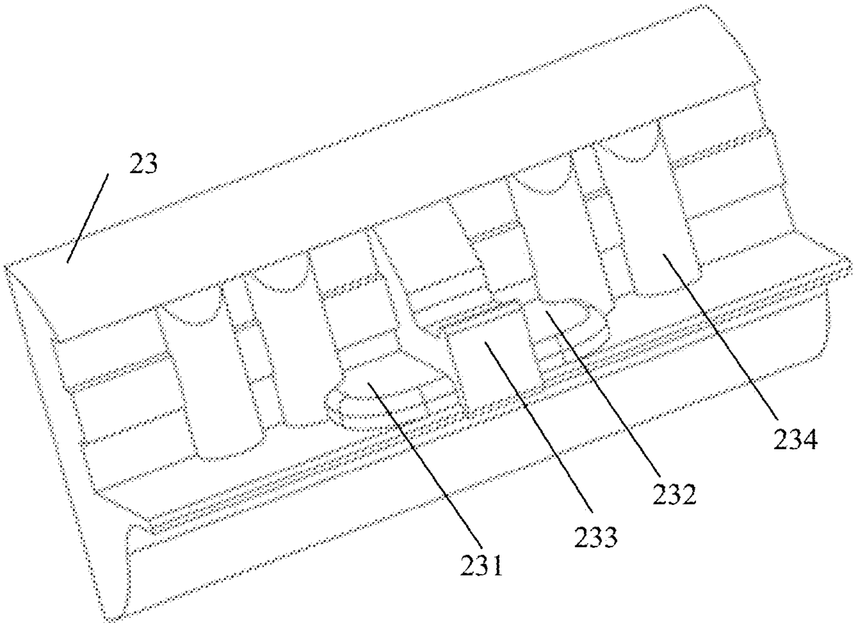
FIG. 11 is a schematic diagram of insulating plastic of still another antenna slot structure according to an embodiment of this application.

FIG. 11 is a schematic diagram of insulating plastic of still another antenna slot structure according to an embodiment of this application.

FIG. 11 shows a form of insulating plastic 23 corresponding to the metal frame shown in FIG. 10A to FIG. 10C after curing. The insulating plastic 23 covers the first side and the second side, and fills the antenna slot 22, each first groove, and each second groove.

When the insulating plastic 23 fills the first groove and the antenna slot, part of insulating plastic numbered 233 is filled in the antenna slot 22, part of insulating plastic numbered 231 is filled in the first groove 2111, part of insulating plastic numbered 232 is filled in the first groove 2111, and part of insulating plastic numbered 234 is filled in the second groove 214.

In the foregoing embodiment, the first part 211 and the second part 212 both include the first groove, and a quantity of first grooves included in the first part 211 is equal to a quantity of first grooves included in the second part 212: and the first part 211 and the second part 212 both include the second groove, and a quantity of second grooves included in the first part 211 is equal to a quantity of second grooves included in the second part 211, so that the antenna slot structure has good symmetry. In an actual application, a quantity of first grooves included in the first part 211 and the second part 212 may not be equal, and a quantity of second grooves included in the first part 211 and the second part 212 may not be equal, for example, the first part 211 includes two second grooves, and the second part 212 includes three second grooves.

In the solution provided in this embodiment of this application, after the antenna slot, each first groove, and each second groove are all filled with the insulating plastic, a contact area between the insulating plastic and the metal frame is increased, and the connection stability and the bonding strength between the insulating plastic and the metal frame are further improved. Specifically, after the first groove is filled with the insulating plastic, a thickness of insulating plastic near the antenna slot is improved, and possibility of cracking of the insulating plastic near the antenna slot is reduced. A structure of the second groove can limit and clamp the insulating plastic and increases a thickness of insulating plastic at the second groove, so that when the antenna slot structure is bent, squeezed, or dropped, or encounters another case, the possibility of cracking is reduced. Therefore, the airtightness of the electronic device is enhanced, and the dustproof and waterproof capabilities of the electronic device are ensured.

In addition, a milled trench may be provided in the first groove and/or the second groove, or a laser carving may be provided in the first groove and/or the second groove, to further improve the connection stability and the bonding strength between the insulating plastic and the metal frame, which is described below in detail with the accompanying drawings.

Figure 12A:
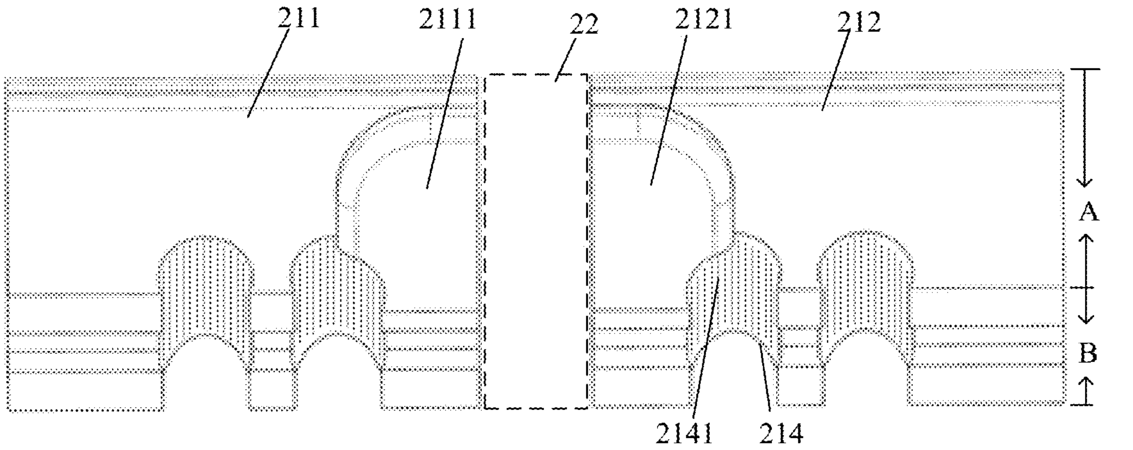
FIG. 12A is a schematic diagram of a metal frame of still another antenna slot structure according to an embodiment of this application.
Figure 12B:
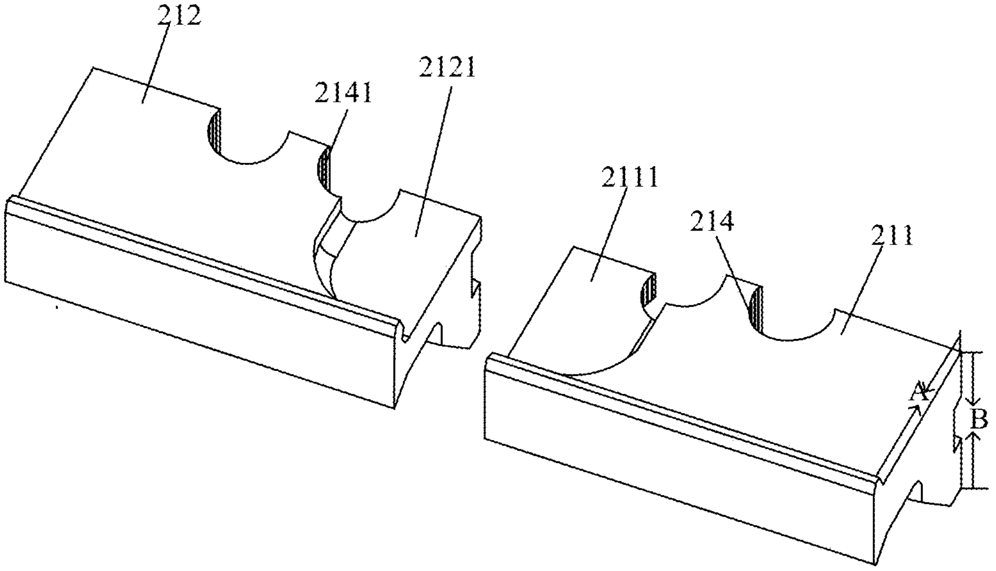
FIG. 12B is a schematic diagram of a metal frame corresponding to FIG. 12A from a different perspective according to an embodiment of this application.

Refer to FIG. 12A and FIG. 12B together. FIG. 12A is a schematic diagram of a metal frame of still another antenna slot structure according to an embodiment of this application. FIG. 12B is a schematic diagram of a metal frame corresponding to FIG. 12A from a different perspective according to an embodiment of this application.

For a second groove 214 on the first part 211 and the second part 212, a milled trench or a laser carving on a concave surface of the second groove is marked with 2141.

With the milled trench or the laser carving on the concave surface of the second groove, a contact area between the insulating plastic and the metal frame is further increased, the connection stability and the bonding strength between the insulating plastic and the metal frame are improved, so that when the antenna slot structure is bent, squeezed, or dropped, or encounters another case, the insulating plastic at the concave surface of the first groove and a contact area of the metal frame do not tend to relatively move. Therefore, possibility of cracking of the insulating plastic at the concave surface of the first groove is reduced, the airtightness of the electronic device is enhanced, and the dustproof and waterproof capabilities of the electronic device are further ensured.

Figure 13A:
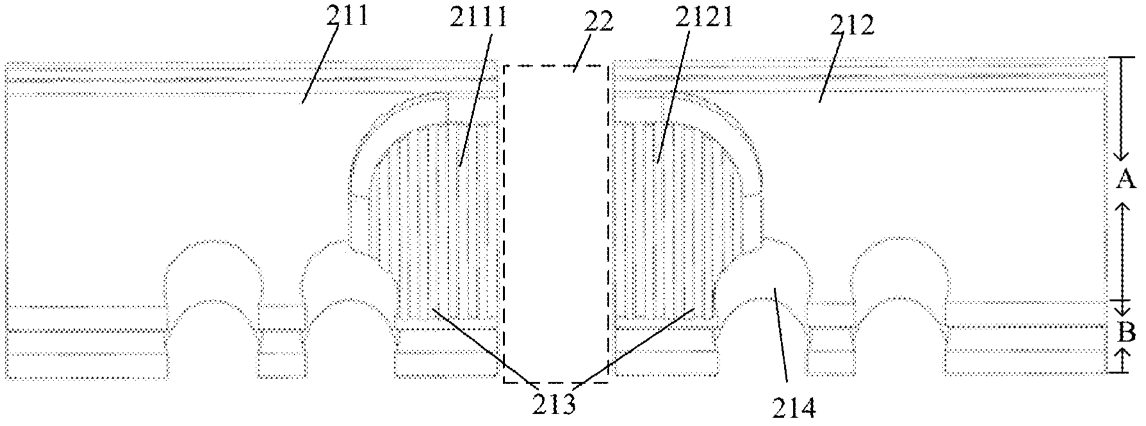
FIG. 13A is a schematic diagram of a metal frame of yet another antenna slot structure according to an embodiment of this application.
Figure 13B:
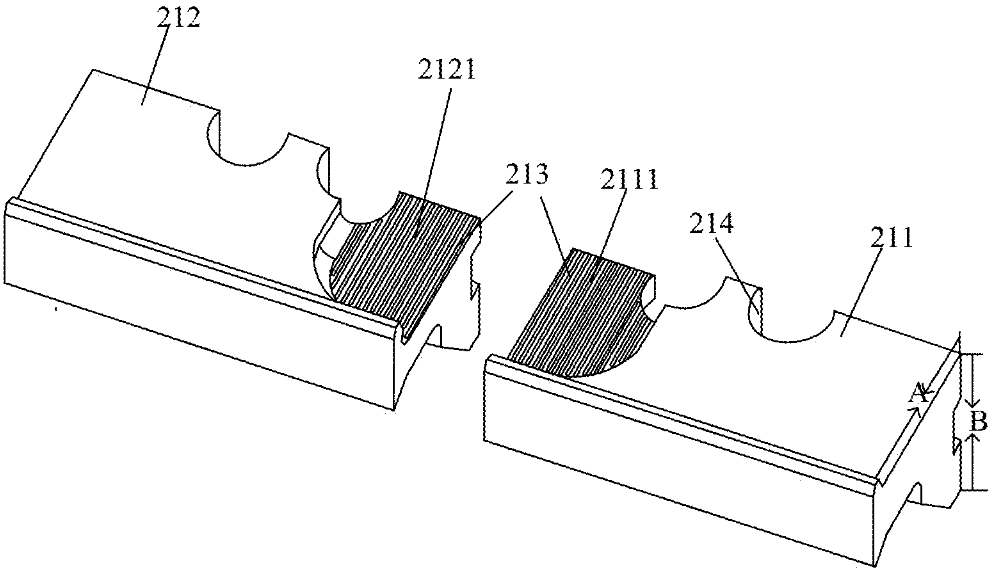
FIG. 13B is a schematic diagram of a metal frame corresponding to FIG. 13A from a different perspective according to an embodiment of this application.

Refer to FIG. 13A and FIG. 13B together. FIG. 13A is a schematic diagram of a metal frame of still another antenna slot structure according to an embodiment of this application. FIG. 13B is a schematic diagram of a metal frame corresponding to FIG. 13A from a different perspective according to an embodiment of this application.

For a first groove on the first part 211 and the second part 212, a milled trench or a laser carving provided on a concave surface of the first groove is marked with 213.

With the milled trench or the laser carving on the concave surface of the first groove, a contact area between the insulating plastic and the metal frame is further increased, the connection stability and the bonding strength between the insulating plastic at the concave surface of the first groove and the metal frame are improved, so that when the antenna slot structure is bent, squeezed, or dropped, or encounters another case, the insulating plastic at the concave surface of the first groove and the metal frame do not tend to relatively move. Therefore, a possibility of cracking of the insulating plastic at the concave surface of the first groove is reduced, the airtightness of the electronic device is enhanced, and the dustproof and waterproof capabilities of the electronic device are further ensured.

Figure 14A:
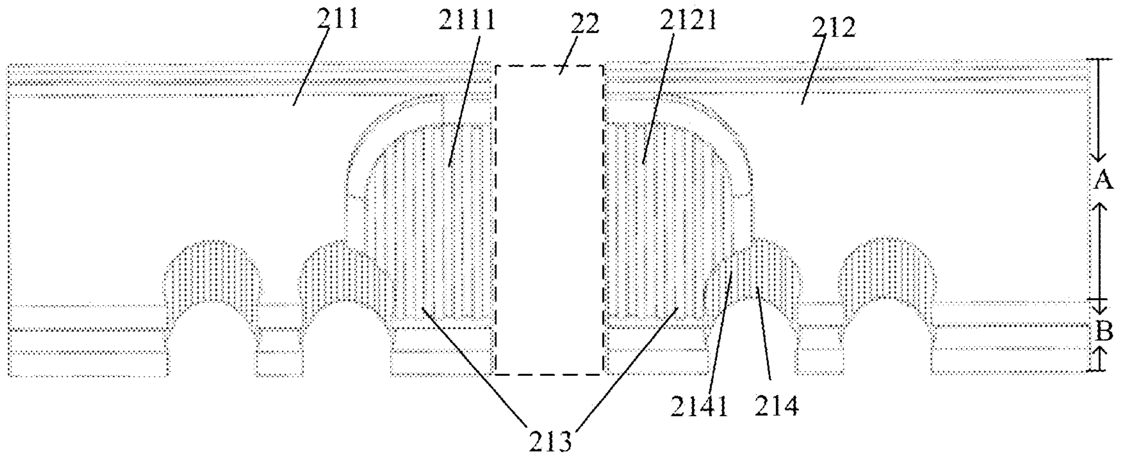
FIG. 14A is a schematic diagram of a metal frame of another antenna slot structure according to an embodiment of this application.
Figure 14B:
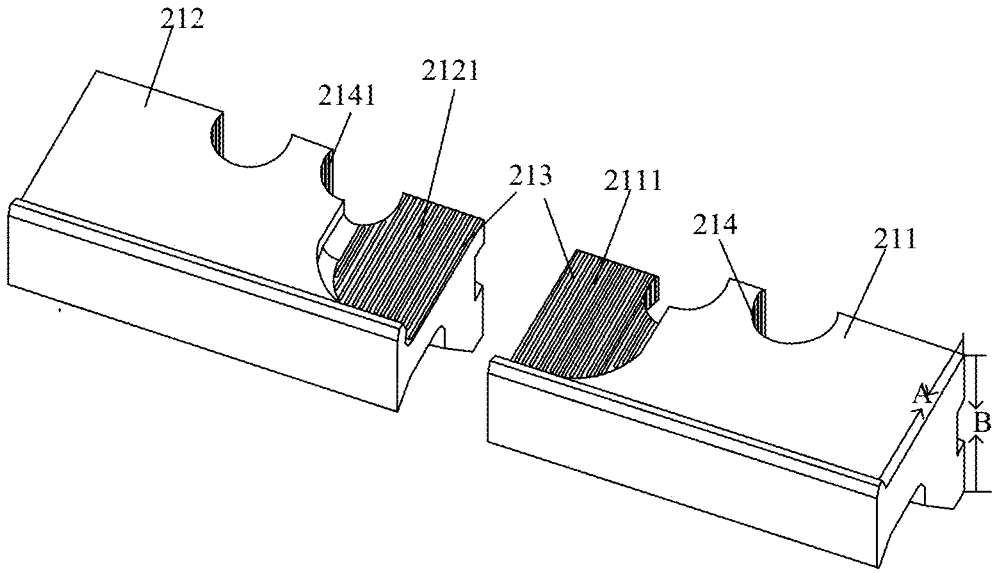
FIG. 14B is a schematic diagram of a metal frame corresponding to FIG. 14A from a different perspective according to an embodiment of this application.

Refer to FIG. 14A and FIG. 14B together. FIG. 14A is a schematic diagram of a metal frame of another antenna slot structure according to an embodiment of this application. FIG. 14B is a schematic diagram of a metal frame corresponding to FIG. 14A from a different perspective according to an embodiment of this application.

For a first groove on the first part 211 and the second part 212, a milled trench or a laser carving provided on a concave surface of the first groove is marked with 213. For a second groove 214 on the first part 211 and the second part 212, a milled trench or a laser carving on a concave surface of the second groove is marked with 2141.

In this solution, the first groove and the second groove are both provided with a milled trench or both provided with a laser carving, increasing the connection stability and bonding strength between insulating plastic at the concave surfaces of the first groove and the second groove and the metal frame, so that when the antenna slot structure is bent, squeezed, or dropped, or encounters another case, the insulating plastic at the concave surfaces of the first groove and the second groove and the metal frame do not tend to relatively move. Therefore, possibility of cracking of the insulating plastic at the concave surfaces of the first groove and the second groove is reduced, the airtightness of the electronic device is enhanced, and the dustproof and waterproof capabilities of the electronic device are further ensured.

In the foregoing embodiment, for the two second grooves included in the first part or the second part of the antenna slot structure, a notch of one of the second grooves on the first side is located outside the first groove, and a notch of the other of the second grooves on the first side is located on the concave surface of the first groove.

Figure 15A:
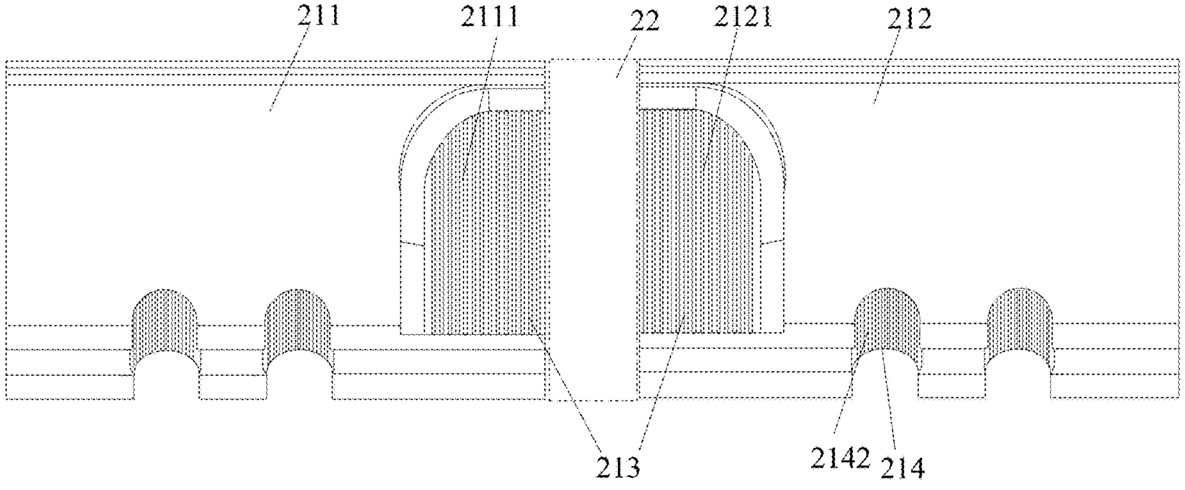
FIG. 15A is a schematic diagram of a metal frame of still another antenna slot structure according to an embodiment of this application.
Figure 15B:
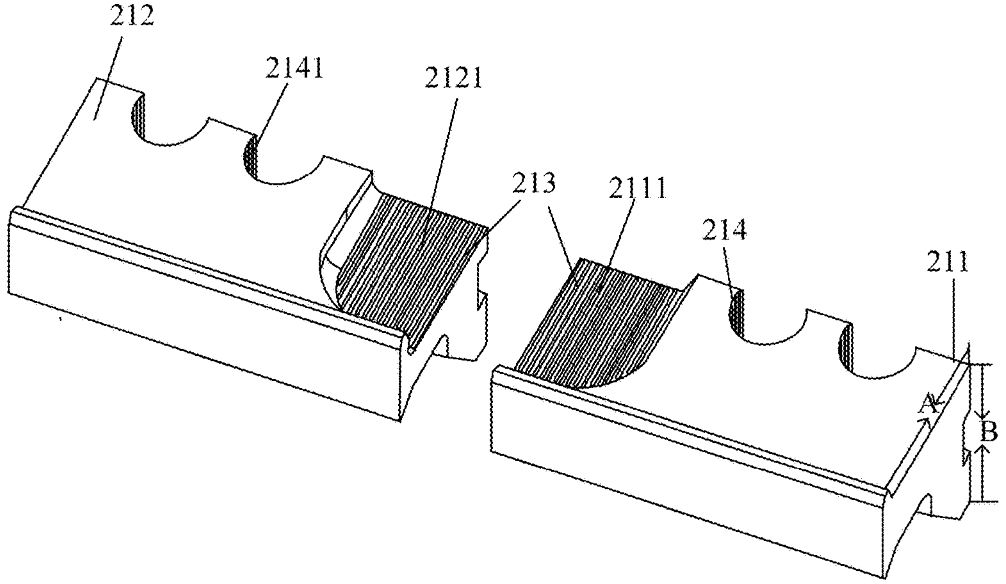
FIG. 15B is a schematic diagram of a metal frame corresponding to FIG. 15A from a different perspective according to an embodiment of this application.

Another implementation of a relative position relationship between the first groove and the second groove when the antenna slot structure includes both the first groove and the second groove is described below:

Refer to FIG. 15A and FIG. 15B together. FIG. 15A is a schematic diagram of a metal frame of still another antenna slot structure according to an embodiment of this application, and FIG. 15B is a schematic diagram of a metal frame corresponding to FIG. 15A from a different perspective according to an embodiment of this application.

In this implementation, each of the first part 211 and the second part 212 includes two second grooves.

An end of each second groove extends to the first side, a notch 2142 of each second groove on the first side is entirely located outside a groove surface of the first groove. The first groove and the second groove are separated from each other in physical position, thereby facilitating processing.

For a second groove 214 on the first part 211 and the second part 212, a milled trench or a laser carving on a concave surface of the second groove is marked with 2141.

Figure 16A:
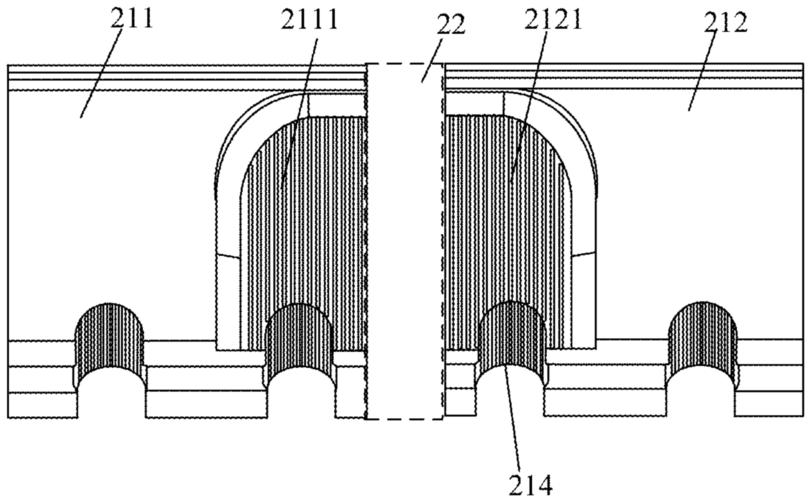
FIG. 16A is a schematic diagram of a metal frame of yet another antenna slot structure according to an embodiment of this application.
Figure 16B:
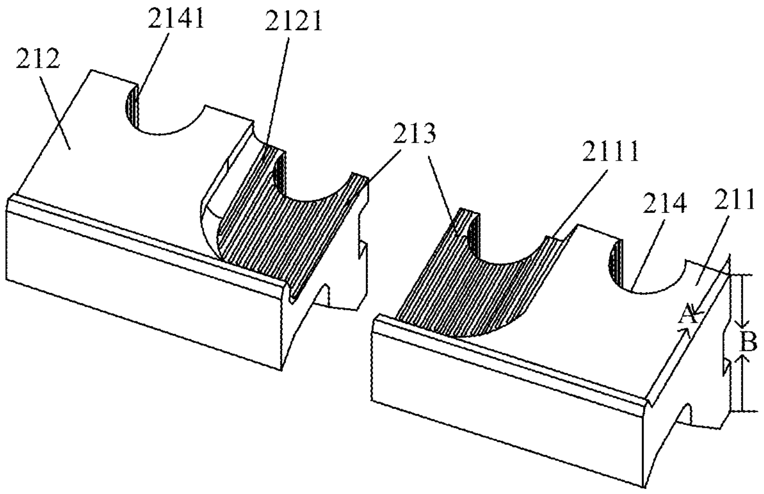
FIG. 16B is a schematic diagram of a metal frame corresponding to FIG. 16A from a different perspective according to an embodiment of this application.

Refer to FIG. 16A and FIG. 16B together. FIG. 16A is a schematic diagram of a metal frame of still another antenna slot structure according to an embodiment of this application. FIG. 16B is a schematic diagram of a metal frame corresponding to FIG. 16A from a different perspective according to an embodiment of this application.

In this implementation, each of the first part 211 and the second part 212 includes two second grooves. The first part 211 and the second part 212 are symmetrical relative to the antenna slot 22. The second groove included in the first part 211 is used as an example for descriptions below:

A notch of one second groove included in the first part 211 on the first side is entirely located in a groove surface of the first groove, and a notch of the other second groove included in the first part 211 on the first side is entirely located outside the groove surface of the first groove.

In this implementation, since a notch of a second groove on the first side is entirely located on the groove surface of the first groove, an occupied size of the second groove during arrangement can be reduced, that is, comparing the manners shown in FIG. 16 and FIG. 15, it can be found that when a same quantity of second grooves are arranged, a size of the antenna slot structure shown in FIG. 16 is less.

For a second groove 214 on the first part 211 and the second part 212, a milled trench or a laser carving on a concave surface of the second groove is marked with 2141.

Figure 17A:
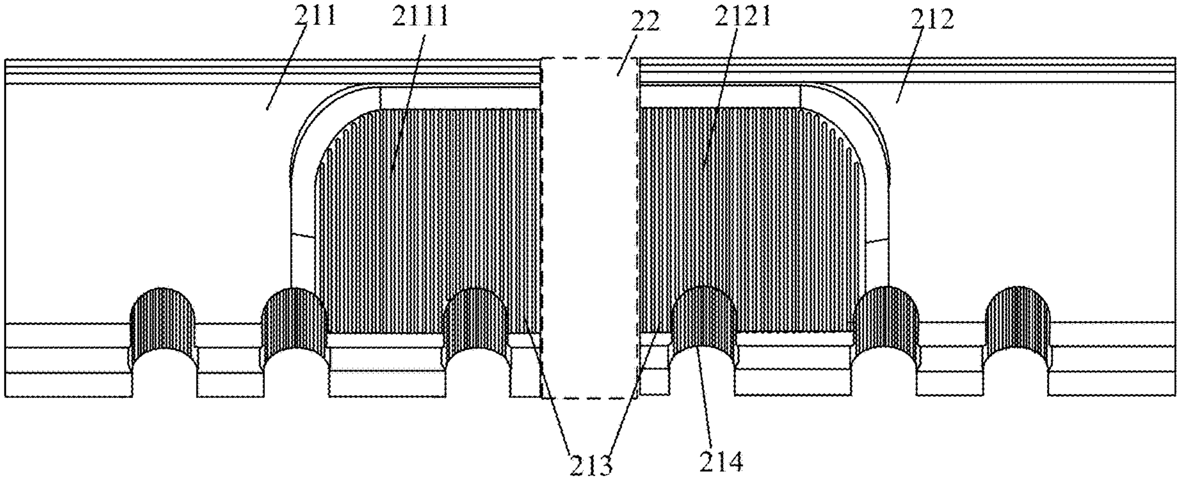
FIG. 17A is a schematic diagram of a metal frame of another antenna slot structure according to an embodiment of this application.
Figure 17B:
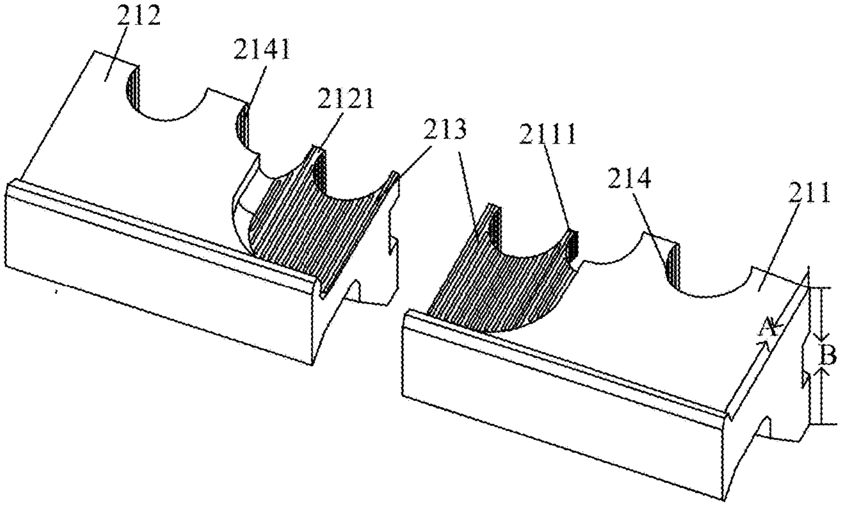
FIG. 17B is a schematic diagram of a metal frame corresponding to FIG. 17A from a different perspective according to an embodiment of this application.

Refer to FIG. 17A and FIG. 17B together. FIG. 17A is a schematic diagram of a metal frame of another antenna slot structure according to an embodiment of this application. FIG. 17B is a schematic diagram of a metal frame corresponding to FIG. 17A from a different perspective according to an embodiment of this application.

In this implementation, each of the first part 211 and the second part 212 includes three second grooves. The first part 211 and the second part 212 are symmetrical relative to the antenna slot 22. The second groove included in the first part 211 is used as an example for descriptions below:

A notch of one second groove included in the first part 211 on the first side is entirely located in a groove surface of the first groove, the first part 211 further includes one second groove whose notch on the first side is entirely located outside the groove surface of the first groove, and the first part 211 further includes a second groove whose notch on the first side is partially located outside the groove surface of the first groove and partially located in the groove surface of the first groove.

In this implementation, since a notch of a second groove on the first side is entirely located in the groove surface of the first groove, and a notch of a second groove on the first side is partially located on the groove surface of the first groove, an occupied size of the second groove during arrangement can be reduced, that is, comparing the manners shown in FIG. 17 and FIG. 15, it can be found that although a larger quantity of second grooves are provided in FIG. 17, a size of the antenna slot structure shown in FIG. 17 is not clearly increased.

For a second groove 214 on the first part 211 and the second part 212, a milled trench or a laser carving on a concave surface of the second groove is marked with 2141.

Figure 18A:
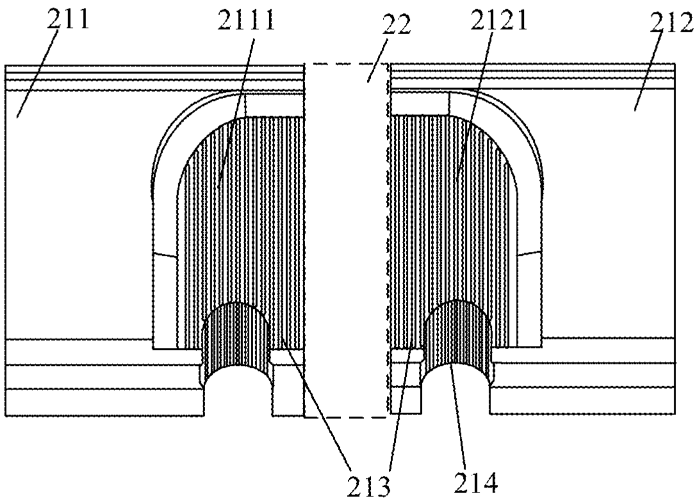
FIG. 18A is a schematic diagram of a metal frame of yet another antenna slot structure according to an embodiment of this application.
Figure 18B:
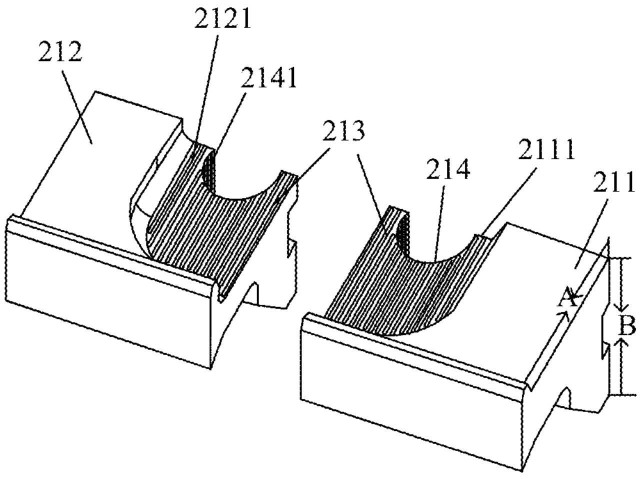
FIG. 18B is a schematic diagram of a metal frame corresponding to FIG. 18A from a different perspective according to an embodiment of this application.

Refer to FIG. 18A and FIG. 18B together. FIG. 18A is a schematic diagram of a metal frame of yet another antenna slot structure according to an embodiment of this application, and FIG. 18B is a schematic diagram of a metal frame corresponding to FIG. 18A from a different perspective according to an embodiment of this application.

In this implementation, each of the first part 211 and the second part 212 includes a second groove. A notch of the second groove shown in the figures on the first side is entirely located on a concave surface of the first groove.

In this implementation, a size of the antenna slot structure can be fully reduced.

In addition, in some other possible implementations, when each of the first part 211 and the second part 212 includes a second groove, a notch of the second groove on the first side may be entirely located on the concave surface of the first groove, or a notch of the second groove on the first side may be partially located on the concave surface of the first groove.

For a second groove 214 on the first part 211 and the second part 212, a milled trench or a laser carving on a concave surface of the second groove is marked with 2141.

Based on the antenna slot structure provided in the foregoing embodiments, the embodiments of this application further provide an electronic device. An antenna and an antenna slot structure provided in the foregoing embodiments are arranged in the electronic device. An example in which an electronic device is a mobile phone is used for descriptions below in detail with accompanying drawings.

Figure 19:
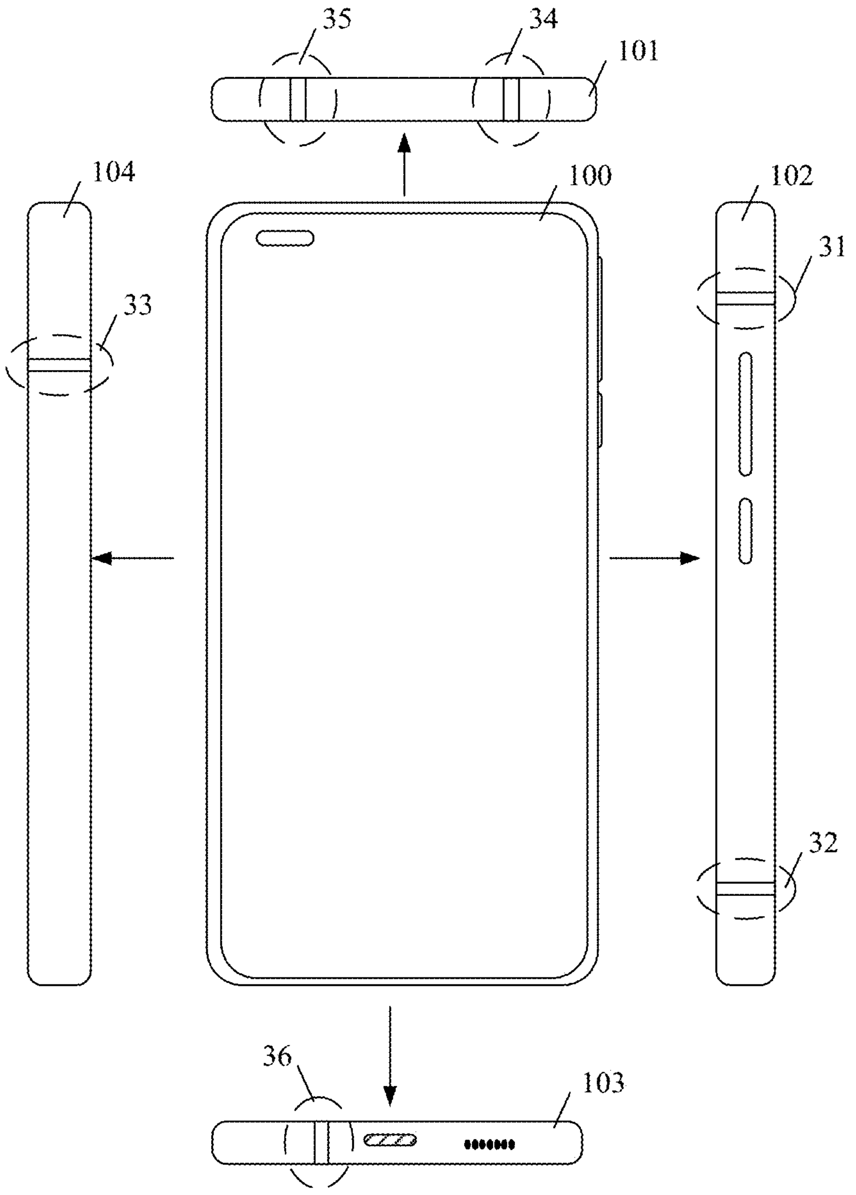
FIG. 19 is a schematic diagram of an electronic device according to an embodiment of this application.

FIG. 19 is a schematic diagram of an electronic device according to an embodiment of this application.

The electronic device 100 includes one or more antenna slot structures provided in the foregoing embodiments, and an example in which a plurality of antenna slot structures provided in the foregoing embodiments are included is used for descriptions below in detail.

The electronic device 100 includes a first short edge 101, a first long edge 102, a second short edge 103, and a second long edge 104.

As shown in FIG. 19, when the electronic device 100 is in a portrait state, the first short edge 101 is an upper edge of the electronic device 100, the first long edge 102 is a right edge of the electronic device 100, the second short edge 103 is a lower edge of the electronic device 100, and the second long edge 103 is a left edge of the electronic device 100.

The plurality of antenna slot structures include a first group of antenna slot structures and a second group of antenna slot structures. The first group of antenna slot structures is located on the first long edge 102, and the second group of antenna slot structures is located on the second long edge 104.

That is, the first group of antenna slot structures in FIG. 19 includes antenna slot structures 31 and 32. The second group of antenna slot structures includes antenna slot structure 33.

In this case, the antenna slot structure shown in FIG. 3 may be arranged on the first short edge 101 and the second short edge 103 of the electronic device may, or the antenna slot structure may not be arranged, which is not specifically limited in this embodiment of this application.

An antenna structure provided in this embodiment of this application is preferentially arranged on a long edge of the electronic device, because compared with a short edge, the long edge of the electronic device is more likely to be bent, squeezed, or dropped, or encounter another case during assembly or use, and the metal frame and the insulating plastic in the antenna slot structure are disconnected, or the insulating plastic is cracked. Therefore, the antenna slot structure provided in this embodiment of this application is arranged on the long edge of the electronic device.

In some other embodiments, to further ensure reliability of the antenna slot structure, the plurality of antenna slot structures include a third group of antenna slot structures and a fourth group of antenna slot structures. The third group of antenna slot structures is located on the first short edge 101, and the fourth group of antenna slot structures is located on the second short edge 103.

That is, the third antenna slot structure in FIG. 19 includes antenna slot structures 34 and 35. The second group of antenna slot structures includes antenna slot structure 36.

In this case, all the antenna slot structures adopt the implementations provided in this embodiment of this application, enhance the airtightness of the electronic device, and further ensure the dustproof and waterproof capabilities of the electronic device.

A specific quantity of the antenna slots included in the first group of antenna slots, the second group of antenna slots, the third group of antenna slots, and the fourth group of antenna slots are not limited in this embodiment of this application, and the foregoing description is only a possible implementation.

For a specific implementation and principle of the antenna slot structure, reference may be made to related description in the foregoing embodiment. Details are not described again in this embodiment of this application.

A shape of the electronic device listed in this embodiment of this application is only a possible implementation, and does not constitute a limitation to the technical solutions of this application.

The electronic device provided in this application may be a mobile phone, a notebook computer, a wearable electronic device (such as a smart watch), a tablet computer, an AR device, a VR device, an in-vehicle device, and the like, and is not specifically limited in this embodiment of this application.

In summary; the first groove and/or the second groove is arranged in the antenna slot structure of the electronic device, after the groove and the antenna slot are both filled with the insulating plastic, a contact area between the insulating plastic and the metal frame is increased, and the connection stability and the bonding strength between the insulating plastic and the metal frame are further improved. Specifically, after the first groove is filled with the insulating plastic, a thickness of insulating plastic near the antenna slot is improved, and possibility of cracking of the insulating plastic near the antenna slot is reduced. The second groove can limit and clamp the insulating plastic, so that when the antenna slot structure is bent, squeezed, or dropped, or encounters another case, possibility of cracking is reduced. Therefore, the airtightness of the electronic device is enhanced, and the dustproof and waterproof capabilities of the electronic device are further ensured.

It should be understood that in this application, "at least one" refers to one or more, and "a plurality of" refers to two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relationship between associated objects before and after the character.

"At least one of the following" or a similar expression thereof refers to any combination of these items, including one item or any combination of a plurality of items. For example, at least one of a, b, or c may indicate that a, b, c, "a and b", "a and c", "b and c", or "a, b, and c", where a, b, and c may be singular or plural.

Based on the above, the foregoing embodiments are merely for describing the technical solutions of this application, but not for limiting. Although this application has been described in detail with reference to the foregoing embodiments, a person skilled in the art should understand that, the technical solutions described in the foregoing embodiments can still be modified, or equivalent replacement may be performed on some technical features: and the modification or replacement does not make the essence of the corresponding technical solutions deviate from the spirit and scope of the technical solutions of the embodiments of this application.

What is claimed is:

1. An antenna slot structure, wherein the antenna slot structure comprises: insulating plastic and a metal frame, wherein the metal frame comprises a first part and a second part, and the first part and the second part are separated to form an antenna slot;

at least one of the first part and the second part is provided with a first groove at the antenna slot;

the first groove starts from the antenna slot and extends toward a direction away from the antenna slot;

the metal frame comprises a first side and a second side connected in sequence, and the first groove is located on the first side;

at least one of the first part and the second part is provided with one second groove on the second side;

the second groove extends to the first side;

a notch of the second groove on the first side is entirely located on a concave surface of the first groove, or a notch of the second groove on the first side is partially located on the concave surface of the first groove; and the insulating plastic fills the first groove and the antenna slot.

2. The antenna slot structure according to claim 1, wherein a concave surface of the first groove comprises at least one of the following:

a milled trench or a laser carving.

3. The antenna slot structure according to claim 1, wherein at least one of the first part and the second part is further provided with one or more second grooves on the second side; and the insulating plastic covers the first side and the second side and fills the one or more second grooves.

4. The antenna slot structure according to claim 3, wherein at least one of the first part and the second part is provided with a plurality of second grooves on the second side;

the plurality of second grooves extend to the first side;

a notch of one of the plurality of second grooves on the first side is partially located on a concave surface of the first groove; and the plurality of second grooves comprise at least one second groove whose notch on the first side is located outside the first groove.

5. The antenna slot structure according to claim 4, wherein the plurality of second grooves further comprise at least one second groove whose notch on the first side is entirely located on the concave surface of the first groove.

6. The antenna slot structure according to claim 3, wherein a concave surface of the one or more second grooves comprises at least one of the following:

a milled trench or a laser carving.

7. The antenna slot structure according to claim 3, wherein the one or more second grooves comprise at least one of the following:

a through groove or a blind groove.

8. The antenna slot structure according to claim 3, wherein the first part and the second part both comprise the one or more second grooves, and a quantity of the one or more second grooves comprised in the first part is equal to a quantity of the one or more second grooves comprised in the second part.

9. The antenna slot structure according to claim 1, wherein the first part and the second part both comprise the first groove, and a quantity of first grooves comprised in the first part is equal to a quantity of first grooves comprised in the second part.

10. An electronic device, wherein the electronic device comprises one or more antenna slot structures, wherein each of the one or more antenna slot structures comprises:

insulating plastic and a metal frame, wherein the metal frame comprises a first part and a second part, and the first part and the second part are separated to form an antenna slot;

at least one of the first part and the second part is provided with a first groove at the antenna slot;

the first groove starts from the antenna slot and extends toward a direction away from the antenna slot;

the metal frame comprises a first side and a second side connected in sequence, and the first groove is located on the first side;

at least one of the first part and the second part is provided with one second groove on the second side;

the second groove extends to the first side;

a notch of the second groove on the first side is entirely located on a concave surface of the first groove, or a notch of the second groove on the first side is partially located on the concave surface of the first groove; and the insulating plastic fills the first groove and the antenna slot.

11. The electronic device according to claim 10, wherein the electronic device comprises a plurality of antenna slot structures, and further comprises a first short edge, a first long edge, a second short edge, and a second long edge connected in sequence;

the plurality of antenna slot structures comprise a first group of antenna slot structures and a second group of antenna slot structures;

the first group of antenna slot structures is located on the first long edge; and the second group of antenna slot structures is located on the second long edge.

12. The electronic device according to claim 11, wherein the plurality of antenna slot structures further comprises a third group of antenna slot structures and a fourth group of antenna slot structures;

the third group of antenna slot structures is located on the first short edge; and the fourth group of antenna slot structures is located on the second short edge.

13. The electronic device according to claim 10, wherein a concave surface of the first groove comprises at least one of the following:

a milled trench or a laser carving.

14. The electronic device according to claim 10, wherein at least one of the first part and the second part is further provided with one or more second grooves on the second side; and the insulating plastic covers the first side and the second side and fills the one or more second grooves.

15. The electronic device according to claim 14, wherein at least one of the first part and the second part is provided with a plurality of second grooves on the second side;

the plurality of second grooves extend to the first side;

a notch of one of the plurality of second grooves on the first side is partially located on a concave surface of the first groove; and the plurality of second grooves comprise at least one second groove whose notch on the first side is located outside the first groove.

16. The electronic device according to claim 15, wherein the plurality of second grooves further comprise at least one second groove whose notch on the first side is entirely located on the concave surface of the first groove.

17. The electronic device according to claim 14, wherein a concave surface of the one or more second grooves comprises at least one of the following:

a milled trench or a laser carving.

18. The electronic device according to claim 14, wherein the one or more second grooves comprise at least one of the following:

a through groove or a blind groove.

19. The electronic device according to claim 14, wherein the first part and the second part both comprise the one or more second grooves, and a quantity of the one or more second grooves comprised in the first part is equal to a quantity of the one or more second grooves comprised in the second part.

20. The electronic device according to claim 10, wherein the first part and the second part both comprise the first groove, and a quantity of first grooves comprised in the first part is equal to a quantity of first grooves comprised in the second part, a through groove or a blind groove.

* * * * *